(12) United States Patent
Ibrahim et al.

(10) Patent No.: US 12,108,429 B2
(45) Date of Patent: Oct. 1, 2024

(54) CHANNEL STATE INFORMATION FOR FULL-DUPLEX AND HALF-DUPLEX WIRELESS COMMUNICATION

(71) Applicant: QUALCOMM Incorporated, San Diego, CA (US)

(72) Inventors: Abdelrahman Mohamed Ahmed Mohamed Ibrahim, San Diego, CA (US); Ahmed Attia Abotabl, San Diego, CA (US); Muhammad Sayed Khairy Abdelghaffar, San Jose, CA (US)

(73) Assignee: QUALCOMM Incorporated, San Diego, CA (US)

( * ) Notice: Subject to any disclaimer, the term of this patent is extended or adjusted under 35 U.S.C. 154(b) by 402 days.

(21) Appl. No.: 17/510,133

(22) Filed: Oct. 25, 2021

(65) Prior Publication Data

US 2023/0130732 A1    Apr. 27, 2023

(51) Int. Cl.
| | |
|---|---|
| *H04W 56/00* | (2009.01) |
| *H04L 5/14* | (2006.01) |
| *H04W 72/0446* | (2023.01) |
| *H04W 72/1263* | (2023.01) |
| *H04W 72/542* | (2023.01) |

(52) U.S. Cl.
CPC ............. *H04W 72/542* (2023.01); *H04L 5/14* (2013.01); *H04W 72/0446* (2013.01); *H04W 72/1263* (2013.01)

(58) Field of Classification Search
CPC ........... H04W 72/542; H04W 72/0446; H04W 72/1263; H04L 5/14

USPC ...................................................... 370/329
See application file for complete search history.

(56) References Cited

U.S. PATENT DOCUMENTS

| 2017/0054544 A1* | 2/2017 | Kazmi | ..................... H04L 5/14 |
| 2019/0141693 A1* | 5/2019 | Guo | ..................... H04L 5/0044 |
| 2022/0069884 A1* | 3/2022 | Zhang | .................. H04B 17/336 |

OTHER PUBLICATIONS

Kim, Method for Reporting Channel State Information in Wireless Communication System and Apparatus for the Same, 2021-07027, CA 303865: (Year: 2018).*

"ナラヤン, Channel Feedback for Vertical and Full-dimensional Beamforming, Mar. 24, 2016, JP 2016509405" (Year: 2014).*

* cited by examiner

*Primary Examiner* — Sai Ming Chan
(74) *Attorney, Agent, or Firm* — Loza & Loza, LLP

(57) ABSTRACT

Aspects relate to reporting channel state information. A base station may configure a user equipment to measure channel state information reference signals associated with full-duplex communication and channel state information reference signals associated with half-duplex communication. In response, the user equipment may report first channel state information associated with the full-duplex communication and second channel state information associated with the half-duplex communication. In some examples, the user equipment reports the second channel state information as a differential relative to the first channel state information. In some examples, the user equipment reports the first channel state information as a differential relative to the second channel state information.

20 Claims, 18 Drawing Sheets

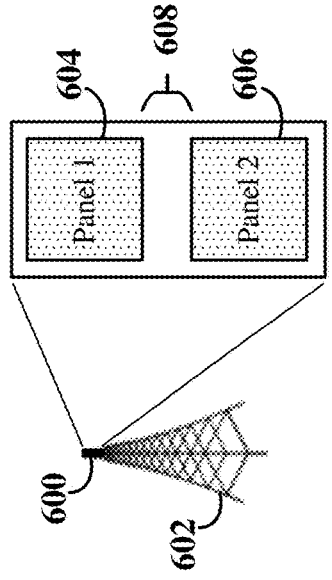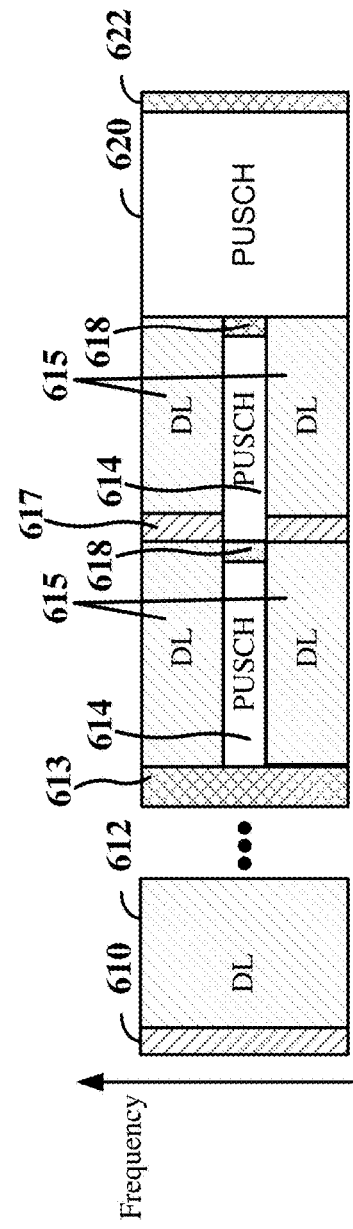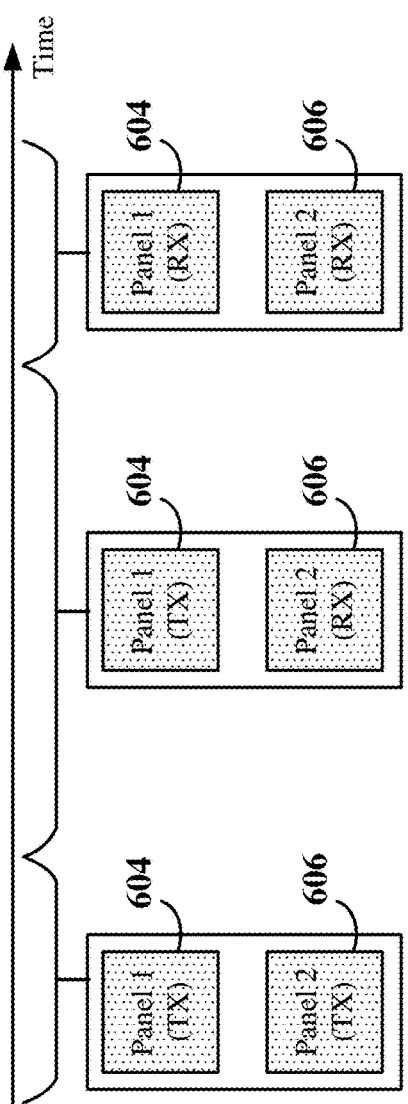
FIG. 6A
FIG. 6B

CHANNEL STATE INFORMATION FOR FULL-DUPLEX AND HALF-DUPLEX WIRELESS COMMUNICATION

TECHNICAL FIELD

The technology discussed below relates generally to wireless communication networks and, more particularly, to channel state information associated with full-duplex communication and channel state information associated with half-duplex communication.

INTRODUCTION

In wireless communication systems, such as those specified under standards for 5G New Radio (NR), a base station and a user equipment (UE) may utilize beamforming to compensate for high path loss and short range. Beamforming is a signal processing technique used with an antenna array (e.g., an antenna array module) for directional signal transmission and/or reception. Each antenna in the antenna array transmits a signal that is combined with other signals of other antennas of the same array in such a way that signals at particular angles experience constructive interference while others experience destructive interference.

The base station and the UE can select one or more beam pair links (BPLs) for communication between the base station and the UE on a downlink and/or an uplink. Each beam pair link (BPL) includes corresponding transmit and receive beams on the base station and the UE. For example, on the downlink, a BPL includes a transmit beam on the base station and a receive beam on the UE. To increase the data rate, multiple BPLs can be used to facilitate spatial multiplexing of multiple data streams from the base station to the UE.

To reduce latency and enhance the spectrum efficiency in a cell, full duplex (FD) communications may be used in 5G systems. In some examples, full-duplex allows simultaneous two-way communication by using spatial multiplexing. In the case of full-duplex using spatial multiplexing, different antenna arrays and beams are operable at the same time but still can achieve full-duplex simultaneous communications through spatial separation (e.g., such as through beam direction). The downlink and uplink frequency bands in full-duplex communications may be fully overlapped, partially overlapped, or separated with a guard band in between.

BRIEF SUMMARY OF SOME EXAMPLES

The following presents a summary of one or more aspects of the present disclosure, in order to provide a basic understanding of such aspects. This summary is not an extensive overview of all contemplated features of the disclosure and is intended neither to identify key or critical elements of all aspects of the disclosure nor to delineate the scope of any or all aspects of the disclosure. Its sole purpose is to present some concepts of one or more aspects of the disclosure in a form as a prelude to the more detailed description that is presented later.

In some examples, a method for wireless communication at a user equipment is disclosed. The method may include receiving a configuration for measuring channel state information reference signals associated with full-duplex communication and half-duplex communication, and transmitting at least one channel state information report including first channel state information and second channel state information. In some aspects, the second channel state information may be defined as a differential relative to the first channel state information.

In some examples, a user equipment may include a transceiver, a memory, and a processor coupled to the transceiver and the memory. The processor and the memory may be configured to receive via the transceiver a configuration for measuring channel state information reference signals associated with full-duplex communication and half-duplex communication, and transmit via the transceiver at least one channel state information report including first channel state information and second channel state information. In some aspects, the second channel state information may be defined as a differential relative to the first channel state information.

In some examples, a user equipment may include means for receiving a configuration for measuring channel state information reference signals associated with full-duplex communication and half-duplex communication, and means for transmitting at least one channel state information report including first channel state information and second channel state information. In some aspects, the second channel state information may be defined as a differential relative to the first channel state information.

In some examples, an article of manufacture for use by a user equipment includes a non-transitory computer-readable medium having stored therein instructions executable by one or more processors of the user equipment to receive a configuration for measuring channel state information reference signals associated with full-duplex communication and half-duplex communication, and transmit at least one channel state information report including first channel state information and second channel state information. In some aspects, the second channel state information may be defined as a differential relative to the first channel state information.

In some examples, a method for wireless communication at a base station is disclosed. The method may include transmitting a configuration for a user equipment to measure channel state information reference signals associated with full-duplex communication and half-duplex communication, and receiving from the user equipment at least one channel state information report including first channel state information and second channel state information. In some aspects, the second channel state information may be defined as a differential relative to the first channel state information.

In some examples, a base station may include a transceiver, a memory, and a processor coupled to the transceiver and the memory. The processor and the memory may be configured to transmit via the transceiver a configuration for a user equipment to measure channel state information reference signals associated with full-duplex communication and half-duplex communication, and receive from the user equipment via the transceiver at least one channel state information report including first channel state information and second channel state information. In some aspects, the second channel state information may be defined as a differential relative to the first channel state information.

In some examples, a base station may include means for transmitting a configuration for a user equipment to measure channel state information reference signals associated with full-duplex communication and half-duplex communication, and means for receiving from the user equipment at least one channel state information report including first channel state information and second channel state information. In some aspects, the second channel state information may be defined as a differential relative to the first channel state information.

In some examples, an article of manufacture for use by a base station includes a non-transitory computer-readable medium having stored therein instructions executable by one or more processors of the base station to transmit a configuration for a user equipment to measure channel state information reference signals associated with full-duplex communication and half-duplex communication, and receive from the user equipment at least one channel state information report including first channel state information and second channel state information. In some aspects, the second channel state information may be defined as a differential relative to the first channel state information.

These and other aspects of the disclosure will become more fully understood upon a review of the detailed description, which follows. Other aspects, features, and examples of the present disclosure will become apparent to those of ordinary skill in the art, upon reviewing the following description of specific, example aspects of the present disclosure in conjunction with the accompanying figures. While features of the present disclosure may be discussed relative to certain examples and figures below, all examples of the present disclosure can include one or more of the advantageous features discussed herein. In other words, while one or more examples may be discussed as having certain advantageous features, one or more of such features may also be used in accordance with the various examples of the disclosure discussed herein. In similar fashion, while example aspects may be discussed below as device, system, or method examples it should be understood that such example aspects can be implemented in various devices, systems, and methods.

BRIEF DESCRIPTION OF THE DRAWINGS

FIG. 6A is a schematic diagram depicting an antenna array according to some aspects.

FIG. 6B is a diagram depicting an example of a transmission and reception configuration of the antenna array of FIG. 6A.

DETAILED DESCRIPTION

Figure 1:
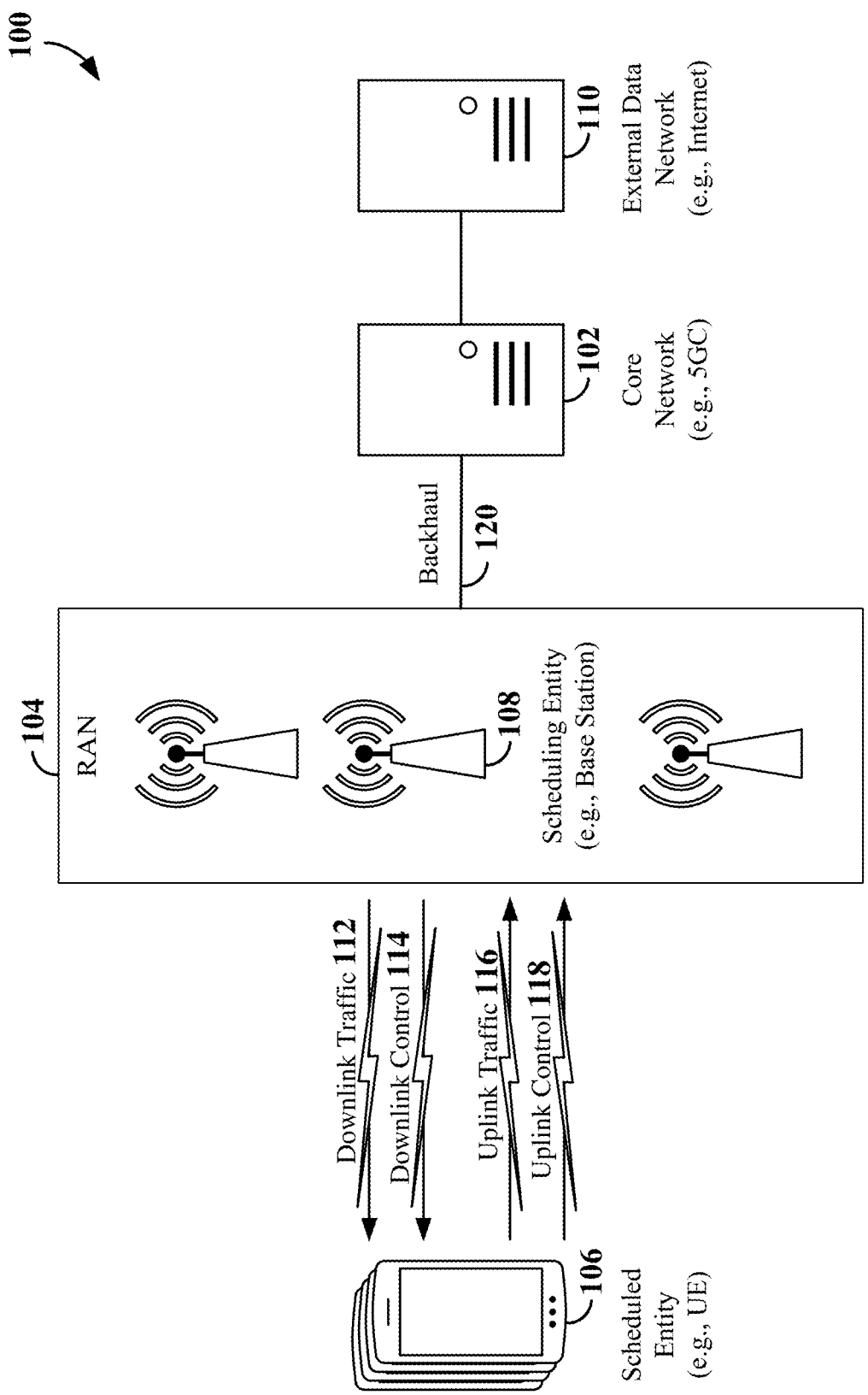
FIG. 1 is a schematic illustration of a wireless communication system according to some aspects.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

While aspects and examples are described in this application by illustration to some examples, those skilled in the art will understand that additional implementations and use cases may come about in many different arrangements and scenarios. Innovations described herein may be implemented across many differing platform types, devices, systems, shapes, sizes, and packaging arrangements. For example, aspects and/or uses may come about via integrated chip examples and other non-module-component based devices (e.g., end-user devices, vehicles, communication devices, computing devices, industrial equipment, retail/purchasing devices, medical devices, artificial intelligence-enabled (AI-enabled) devices, etc.). While some examples may or may not be specifically directed to use cases or applications, a wide assortment of applicability of described innovations may occur. Implementations may range a spectrum from chip-level or modular components to non-modular, non-chip-level implementations and further to aggregate, distributed, or original equipment manufacturer (OEM) devices or systems incorporating one or more aspects of the described innovations. In some practical settings, devices incorporating described aspects and features may also necessarily include additional components and features for implementation and practice of claimed and described examples. For example, transmission and reception of wireless signals necessarily includes a number of components for analog and digital purposes (e.g., hardware components including antenna, radio frequency (RF) chains, power amplifiers, modulators, buffer, processor(s), interleaver, adders/summers, etc.). It is intended that innovations described herein may be practiced in a wide variety of devices, chip-level components, systems, distributed arrangements, disaggregated arrangements (e.g., base station and/or UE), end-user devices, etc. of varying sizes, shapes, and constitution.

The disclosure relates in some aspects to reporting channel state information in a wireless communication system that supports full-duplex communication and half-duplex communication. For example, a base station may schedule one or more time slots (which may be referred to simply as slots) for full-duplex communication with at least one user equipment and schedule at least one other slot for half-duplex communication with one or more user equipment.

In some scenarios, the channel conditions associated with a full-duplex slot may be different from the channel conditions associated with a half-duplex slot. Thus, the base station may configure a user equipment to measure channel state information reference signals associated with full-duplex communication (e.g., on designated full-duplex slots) and also measure channel state information reference signals associated with half-duplex communication (e.g., on designated half-duplex slots).

After conducting these measurements, the user equipment may report first channel state information associated with the full-duplex communication and second channel state information associated with the half-duplex communication. In some examples, the user equipment may send a single channel state information report that includes the first channel state information associated with the full-duplex communication and the second channel state information associated with the half-duplex communication. In some examples, the user equipment may send multiple channel state information reports, where one report includes the first channel state information associated with the full-duplex communication and another report includes the second channel state information associated with the half-duplex communication.

The user equipment may report some of the channel state information in a compressed form. For example, the user equipment may report one set of channel state information as a baseline and report another set of channel state information as a delta, relative to the baseline. In some examples, the user equipment reports the second channel state information as a differential relative to the first channel state information. In some examples, the user equipment reports the first channel state information as a differential relative to the second channel state information.

The various concepts presented throughout this disclosure may be implemented across a broad variety of telecommunication systems, network architectures, and communication standards. Referring now to FIG. 1, as an illustrative example without limitation, various aspects of the present disclosure are illustrated with reference to a wireless communication system 100. The wireless communication system 100 includes three interacting domains: a core network 102, a radio access network (RAN) 104, and a user equipment (UE) 106. By virtue of the wireless communication system 100, the UE 106 may be enabled to carry out data communication with an external data network 110, such as (but not limited to) the Internet.

The RAN 104 may implement any suitable wireless communication technology or technologies to provide radio access to the UE 106. As one example, the RAN 104 may operate according to 3rd Generation Partnership Project (3GPP) New Radio (NR) specifications, often referred to as 5G. As another example, the RAN 104 may operate under a hybrid of 5G NR and Evolved Universal Terrestrial Radio Access Network (eUTRAN) standards, often referred to as Long-Term Evolution (LTE). The 3GPP refers to this hybrid RAN as a next-generation RAN, or NG-RAN. In another example, the RAN 104 may operate according to both the LTE and 5G NR standards. Of course, many other examples may be utilized within the scope of the present disclosure.

As illustrated, the RAN 104 includes a plurality of base stations 108. Broadly, a base station is a network element in a radio access network responsible for radio transmission and reception in one or more cells to or from a UE. In different technologies, standards, or contexts, a base station may variously be referred to by those skilled in the art as a base transceiver station (BTS), a radio base station, a radio transceiver, a transceiver function, a basic service set (BSS), an extended service set (ESS), an access point (AP), a Node B (NB), an eNode B (eNB), a gNode B (gNB), a transmission and reception point (TRP), or some other suitable terminology. In some examples, a base station may include two or more TRPs that may be collocated or non-collocated. Each TRP may communicate on the same or different carrier frequency within the same or different frequency band. In examples where the RAN 104 operates according to both the LTE and 5G NR standards, one of the base stations 108 may be an LTE base station, while another base station may be a 5G NR base station.

The radio access network 104 is further illustrated supporting wireless communication for multiple mobile apparatuses. A mobile apparatus may be referred to as user equipment (UE) 106 in 3GPP standards, but may also be referred to by those skilled in the art as a mobile station (MS), a subscriber station, a mobile unit, a subscriber unit, a wireless unit, a remote unit, a mobile device, a wireless device, a wireless communications device, a remote device, a mobile subscriber station, an access terminal (AT), a mobile terminal, a wireless terminal, a remote terminal, a handset, a terminal, a user agent, a mobile client, a client, or some other suitable terminology. A UE 106 may be an apparatus that provides a user with access to network services. In examples where the RAN 104 operates according to both the LTE and 5G NR standards, the UE 106 may be an Evolved-Universal Terrestrial Radio Access Network-New Radio dual connectivity (EN-DC) UE that is capable of simultaneously connecting to an LTE base station and an NR base station to receive data packets from both the LTE base station and the NR base station.

Within the present document, a mobile apparatus need not necessarily have a capability to move, and may be stationary. The term mobile apparatus or mobile device broadly refers to a diverse array of devices and technologies. UEs may include a number of hardware structural components sized, shaped, and arranged to help in communication; such components can include antennas, antenna arrays, RF chains, amplifiers, one or more processors, etc. electrically coupled to each other. For example, some non-limiting examples of a mobile apparatus include a mobile, a cellular (cell) phone, a smart phone, a session initiation protocol (SIP) phone, a laptop, a personal computer (PC), a notebook, a netbook, a smartbook, a tablet, a personal digital assistant (PDA), and a broad array of embedded systems, e.g., corresponding to an Internet of Things (IoT).

A mobile apparatus may additionally be an automotive or other transportation vehicle, a remote sensor or actuator, a robot or robotics device, a satellite radio, a global positioning system (GPS) device, an object tracking device, a drone, a multi-copter, a quad-copter, a remote control device, a consumer and/or wearable device, such as eyewear, a wearable camera, a virtual reality device, a smart watch, a health or fitness tracker, a digital audio player (e.g., MP3 player), a camera, a game console, etc. A mobile apparatus may additionally be a digital home or smart home device such as a home audio, video, and/or multimedia device, an appliance, a vending machine, intelligent lighting, a home security system, a smart meter, etc. A mobile apparatus may additionally be a smart energy device, a security device, a solar panel or solar array, a municipal infrastructure device controlling electric power (e.g., a smart grid), lighting, water, etc., an industrial automation and enterprise device, a logistics controller, agricultural equipment, etc. Still further, a mobile apparatus may provide for connected medicine or telemedicine support, i.e., health care at a distance. Telehealth devices may include telehealth monitoring devices and telehealth administration devices, whose communication may be given preferential treatment or prioritized access over other types of information, e.g., in terms of prioritized access for transport of critical service data, and/or relevant QoS for transport of critical service data.

Wireless communication between a RAN 104 and a UE 106 may be described as utilizing an air interface. Transmissions over the air interface from a base station (e.g., base station 108) to one or more UEs (e.g., UE 106) may be referred to as downlink (DL) transmission. In some examples, the term downlink may refer to a point-to-multipoint transmission originating at a base station (e.g., base station 108). Another way to describe this point-to-multipoint transmission scheme may be to use the term broadcast channel multiplexing. Transmissions from a UE (e.g., UE 106) to a base station (e.g., base station 108) may be referred to as uplink (UL) transmissions. In some examples, the term uplink may refer to a point-to-point transmission originating at a UE (e.g., UE 106).

In some examples, access to the air interface may be scheduled, wherein a scheduling entity (e.g., a base station 108) allocates resources for communication among some or all devices and equipment within its service area or cell. Within the present disclosure, as discussed further below, the scheduling entity may be responsible for scheduling, assigning, reconfiguring, and releasing resources for one or more scheduled entities (e.g., UEs). That is, for scheduled communication, a plurality of UEs 106, which may be scheduled entities, may utilize resources allocated by a scheduling entity (e.g., a base station 108).

Base stations 108 are not the only entities that may function as scheduling entities. That is, in some examples, a UE may function as a scheduling entity, scheduling resources for one or more scheduled entities (e.g., one or more other UEs). For example, UEs may communicate with other UEs in a peer-to-peer or device-to-device fashion and/or in a relay configuration.

As illustrated in FIG. 1, a scheduling entity (e.g., a base station 108) may broadcast downlink traffic 112 to one or more scheduled entities (e.g., a UE 106). Broadly, the scheduling entity is a node or device responsible for scheduling traffic in a wireless communication network, including the downlink traffic 112 and, in some examples, uplink traffic 116 and/or uplink control information 118 from one or more scheduled entities to the scheduling entity. On the other hand, the scheduled entity is a node or device that receives downlink control information 114, including but not limited to scheduling information (e.g., a grant), synchronization or timing information, or other control information from another entity in the wireless communication network such as the scheduling entity.

In addition, the uplink control information 118, downlink control information 114, downlink traffic 112, and/or uplink traffic 116 may be time-divided into frames, subframes, slots, and/or symbols. As used herein, a symbol may refer to a unit of time that, in an orthogonal frequency division multiplexed (OFDM) waveform, carries one resource element (RE) per sub-carrier. A slot may carry 7 or 14 OFDM symbols in some examples. A subframe may refer to a duration of 1 millisecond (ms). Multiple subframes or slots may be grouped together to form a single frame or radio frame. Within the present disclosure, a frame may refer to a predetermined duration (e.g., 10 ms) for wireless transmissions, with each frame consisting of, for example, 10 subframes of 1 ms each. Of course, these definitions are not required, and any suitable scheme for organizing waveforms may be utilized, and various time divisions of the waveform may have any suitable duration.

In general, base stations 108 may include a backhaul interface for communication with a backhaul 120 of the wireless communication system. The backhaul 120 may provide a link between a base station 108 and the core network 102. Further, in some examples, a backhaul network may provide interconnection between the respective base stations 108. Various types of backhaul interfaces may be employed, such as a direct physical connection, a virtual network, or the like using any suitable transport network.

The core network 102 may be a part of the wireless communication system 100, and may be independent of the radio access technology used in the RAN 104. In some examples, the core network 102 may be configured according to 5G standards (e.g., 5GC). In other examples, the core network 102 may be configured according to a 4G evolved packet core (EPC), or any other suitable standard or configuration.

Figure 2:
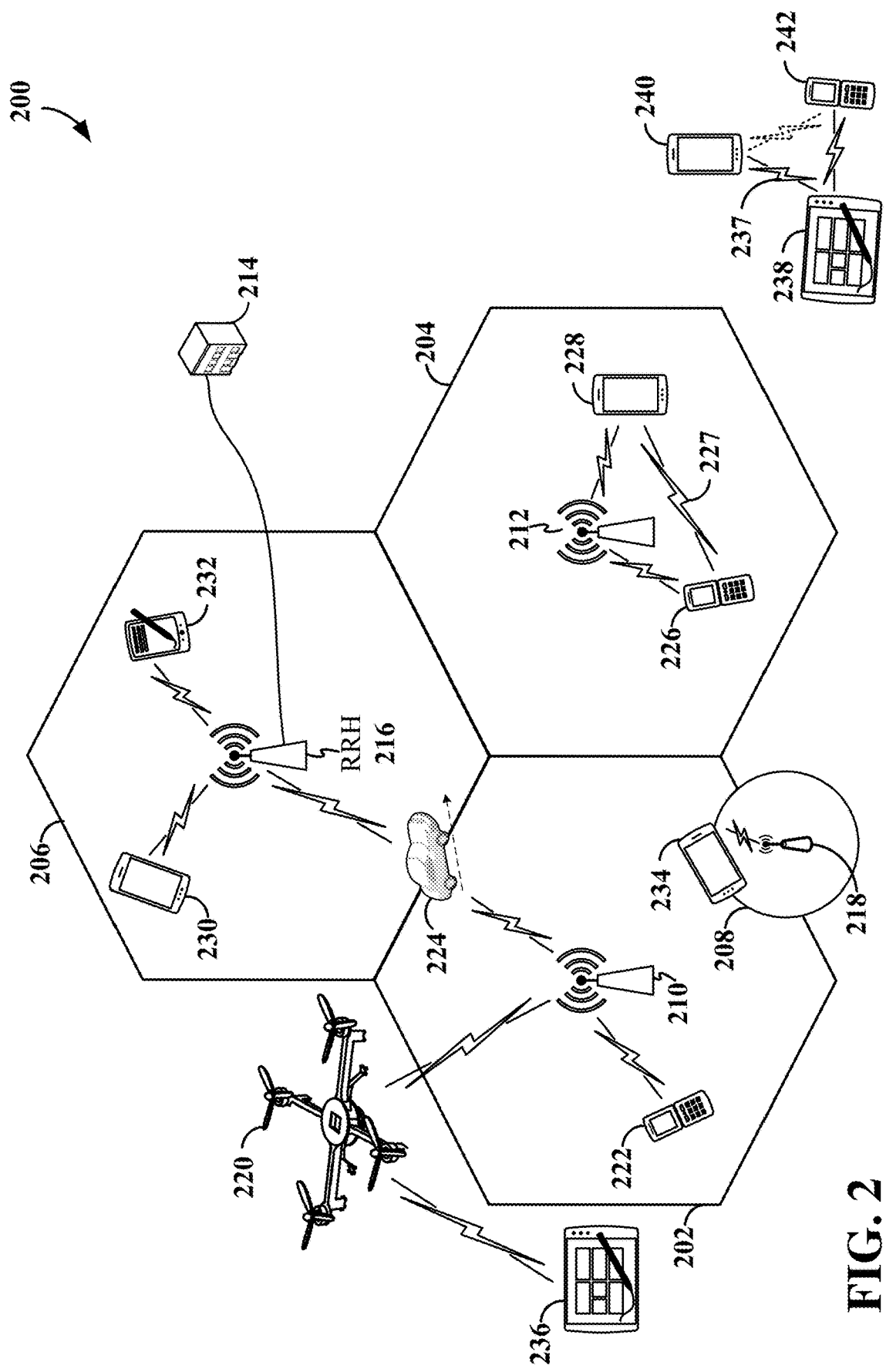
FIG. 2 is a conceptual illustration of an example of a radio access network according to some aspects.

Referring now to FIG. 2, by way of example and without limitation, a schematic illustration of a radio access network (RAN) 200 is provided. In some examples, the RAN 200 may be the same as the RAN 104 described above and illustrated in FIG. 1.

The geographic area covered by the RAN 200 may be divided into cellular regions (cells) that can be uniquely identified by a user equipment (UE) based on an identification broadcasted from one access point or base station. FIG. 2 illustrates cells 202, 204, 206, and 208, each of which may include one or more sectors (not shown). A sector is a sub-area of a cell. All sectors within one cell are served by the same base station. A radio link within a sector can be identified by a single logical identification belonging to that sector. In a cell that is divided into sectors, the multiple sectors within a cell can be formed by groups of antennas with each antenna responsible for communication with UEs in a portion of the cell.

Various base station arrangements can be utilized. For example, in FIG. 2, two base stations 210 and 212 are shown in cells 202 and 204; and a base station 214 is shown controlling a remote radio head (RRH) 216 in cell 206. That is, a base station can have an integrated antenna or can be connected to an antenna or RRH by feeder cables. In the illustrated example, the cells 202, 204, and 206 may be referred to as macrocells, as the base stations 210, 212, and 214 support cells having a large size. Further, a base station 218 is shown in the cell 208, which may overlap with one or more macrocells. In this example, the cell 208 may be referred to as a small cell (e.g., a microcell, picocell, femtocell, home base station, home Node B, home eNode B, etc.), as the base station 218 supports a cell having a relatively small size. Cell sizing can be done according to system design as well as component constraints.

It is to be understood that the RAN 200 may include any number of wireless base stations and cells. Further, a relay node may be deployed to extend the size or coverage area of a given cell. The base stations 210, 212, 214, 218 provide wireless access points to a core network for any number of mobile apparatuses. In some examples, the base stations 210, 212, 214, and/or 218 may be the same as the base station/scheduling entity described above and illustrated in FIG. 1.

FIG. 2 further includes an unmanned aerial vehicle (UAV) 220, which may be a drone or quadcopter. The UAV 220 may be configured to function as a base station, or more specifically as a mobile base station. That is, in some examples, a cell may not necessarily be stationary, and the geographic area of the cell may move according to the location of a mobile base station, such as the UAV 220.

Within the RAN 200, the cells may include UEs that may be in communication with one or more sectors of each cell. Further, each base station 210, 212, 214, and 218 may be configured to provide an access point to a core network 102 (see FIG. 1) for all the UEs in the respective cells. For example, UEs 222 and 224 may be in communication with base station 210; UEs 226 and 228 may be in communication with base station 212; UEs 230 and 232 may be in communication with base station 214 by way of RRH 216; and UE 234 may be in communication with base station 218. In some examples, the UEs 222, 224, 226, 228, 230, 232, 234, 236, 238, 240, and/or 242 may be the same as the UE/scheduled entity described above and illustrated in FIG. 1. In some examples, the UAV 220 (e.g., the quadcopter) can be a mobile network node and may be configured to function as a UE. For example, the UAV 220 may operate within cell 202 by communicating with base station 210.

In a further aspect of the RAN 200, sidelink signals may be used between UEs without necessarily relying on scheduling or control information from a base station. Sidelink communication may be utilized, for example, in a device-to-device (D2D) network, peer-to-peer (P2P) network, vehicle-to-vehicle (V2V) network, vehicle-to-everything (V2X) network, and/or other suitable sidelink network. For example, two or more UEs (e.g., UEs 238, 240, and 242) may communicate with each other using sidelink signals 237 without relaying that communication through a base station. In some examples, the UEs 238, 240, and 242 may each function as a scheduling entity or transmitting sidelink device and/or a scheduled entity or a receiving sidelink device to schedule resources and communicate sidelink signals 237 therebetween without relying on scheduling or control information from a base station. In other examples, two or more UEs (e.g., UEs 226 and 228) within the coverage area of a base station (e.g., base station 212) may also communicate sidelink signals 227 over a direct link (sidelink) without conveying that communication through the base station 212. In this example, the base station 212 may allocate resources to the UEs 226 and 228 for the sidelink communication.

In the RAN 200, the ability for a UE to communicate while moving, independent of its location, is referred to as mobility. The various physical channels between the UE and the radio access network are generally set up, maintained, and released under the control of an access and mobility management function (AMF, not illustrated, part of the core network 102 in FIG. 1), which may include a security context management function (SCMF) that manages the security context for both the control plane and the user plane functionality, and a security anchor function (SEAF) that performs authentication.

A RAN 200 may utilize DL-based mobility or UL-based mobility to enable mobility and handovers (i.e., the transfer of a UE's connection from one radio channel to another). In a network configured for DL-based mobility, during a call with a scheduling entity, or at any other time, a UE may monitor various parameters of the signal from its serving cell as well as various parameters of neighboring cells. Depending on the quality of these parameters, the UE may maintain communication with one or more of the neighboring cells. During this time, if the UE moves from one cell to another, or if signal quality from a neighboring cell exceeds that from the serving cell for a given amount of time, the UE may undertake a handoff or handover from the serving cell to the neighboring (target) cell. For example, UE 224 (illustrated as a vehicle, although any suitable form of UE may be used) may move from the geographic area corresponding to its serving cell (e.g., the cell 202) to the geographic area corresponding to a neighbor cell (e.g., the cell 206). When the signal strength or quality from the neighbor cell exceeds that of the serving cell for a given amount of time, the UE 224 may transmit a reporting message to its serving base station (e.g., the base station 210) indicating this condition. In response, the UE 224 may receive a handover command, and the UE may undergo a handover to the cell 206.

In a network configured for UL-based mobility, UL reference signals from each UE may be utilized by the network to select a serving cell for each UE. In some examples, the base stations 210, 212, and 214/216 may broadcast unified synchronization signals (e.g., unified Primary Synchronization Signals (PSSs), unified Secondary Synchronization Signals (SSSs) and unified Physical Broadcast Channels (PBCH)). The UEs 222, 224, 226, 228, 230, and 232 may receive the unified synchronization signals, derive the carrier frequency and slot timing from the synchronization signals, and in response to deriving timing, transmit an uplink pilot or reference signal. The uplink pilot signal transmitted by a UE (e.g., UE 224) may be concurrently received by two or more cells (e.g., base stations 210 and 214/216) within the RAN 200. Each of the cells may measure a strength of the pilot signal, and the radio access network (e.g., one or more of the base stations 210 and 214/216 and/or a central node within the core network) may determine a serving cell for the UE 224. As the UE 224 moves through the RAN 200, the network may continue to monitor the uplink pilot signal transmitted by the UE 224. When the signal strength or quality of the pilot signal measured by a neighboring cell exceeds that of the signal strength or quality measured by the serving cell, the RAN 200 may handover the UE 224 from the serving cell to the neighboring cell, with or without informing the UE 224.

Although the synchronization signal transmitted by the base stations 210, 212, and 214/216 may be unified, the synchronization signal may not identify a particular cell, but rather may identify a zone of multiple cells operating on the same frequency and/or with the same timing. The use of zones in 5G networks or other next generation communication networks enables the uplink-based mobility framework and improves the efficiency of both the UE and the network, since the number of mobility messages that need to be exchanged between the UE and the network may be reduced.

In various implementations, the air interface in the RAN 200 may utilize licensed spectrum, unlicensed spectrum, or shared spectrum. Licensed spectrum provides for exclusive use of a portion of the spectrum, generally by virtue of a mobile network operator purchasing a license from a government regulatory body. Unlicensed spectrum provides for shared use of a portion of the spectrum without the need for a government-granted license. While compliance with some technical rules is generally still required to access unlicensed spectrum, generally, any operator or device may gain access. Shared spectrum may fall between licensed and unlicensed spectrum, wherein technical rules or limitations may be required to access the spectrum, but the spectrum may still be shared by multiple operators and/or multiple radio access technologies (RATs). For example, the holder of a license for a portion of licensed spectrum may provide licensed shared access (LSA) to share that spectrum with other parties, e.g., with suitable licensee-determined conditions to gain access.

The air interface in the RAN 200 may utilize one or more multiplexing and multiple access algorithms to enable simultaneous communication of the various devices. For example, 5G NR specifications provide multiple access for UL transmissions from UEs 222 and 224 to base station 210, and for multiplexing for DL transmissions from base station 210 to one or more UEs 222 and 224, utilizing orthogonal frequency division multiplexing (OFDM) with a cyclic prefix (CP). In addition, for UL transmissions, 5G NR specifications provide support for discrete Fourier transform-spread-OFDM (DFT-s-OFDM) with a CP (also referred to as single-carrier FDMA (SC-FDMA)). However, within the scope of the present disclosure, multiplexing and multiple access are not limited to the above schemes, and may be provided utilizing time division multiple access (TDMA), code division multiple access (CDMA), frequency division multiple access (FDMA), sparse code multiple access (SCMA), resource spread multiple access (RSMA), or other suitable multiple access schemes. Further, multiplexing DL transmissions from the base station 210 to UEs 222 and 224 may be provided utilizing time division multiplexing (TDM), code division multiplexing (CDM), frequency division multiplexing (FDM), orthogonal frequency division multiplexing (OFDM), sparse code multiplexing (SCM), or other suitable multiplexing schemes.

The air interface in the RAN 200 may further utilize one or more duplexing algorithms. Duplex refers to a point-to-point communication link where both endpoints can communicate with one another in both directions. Full-duplex means both endpoints can simultaneously communicate with one another. Half-duplex means only one endpoint can send information to the other at a time. Half-duplex emulation is frequently implemented for wireless links utilizing time division duplex (TDD). In TDD, transmissions in different directions on a given channel are separated from one another using time division multiplexing. That is, at some times the channel is dedicated for transmissions in one direction, while at other times the channel is dedicated for transmissions in the other direction, where the direction may change very rapidly, e.g., several times per slot. In a wireless link, a full-duplex channel generally relies on physical isolation of a transmitter and receiver, and suitable interference cancelation technologies. Full-duplex emulation is frequently implemented for wireless links by utilizing frequency division duplex (FDD) or spatial division duplex (SDD). In FDD, transmissions in different directions operate at different carrier frequencies. In SDD, transmissions in different directions on a given channel are separate from one another using spatial division multiplexing (SDM). In other examples, full-duplex communication may be implemented within unpaired spectrum (e.g., within a single carrier bandwidth), where transmissions in different directions occur within different sub-bands of the carrier bandwidth. This type of full-duplex communication may be referred to as sub-band full-duplex (SBFD), cross-division duplex (ad), or flexible duplex.

Figure 3:
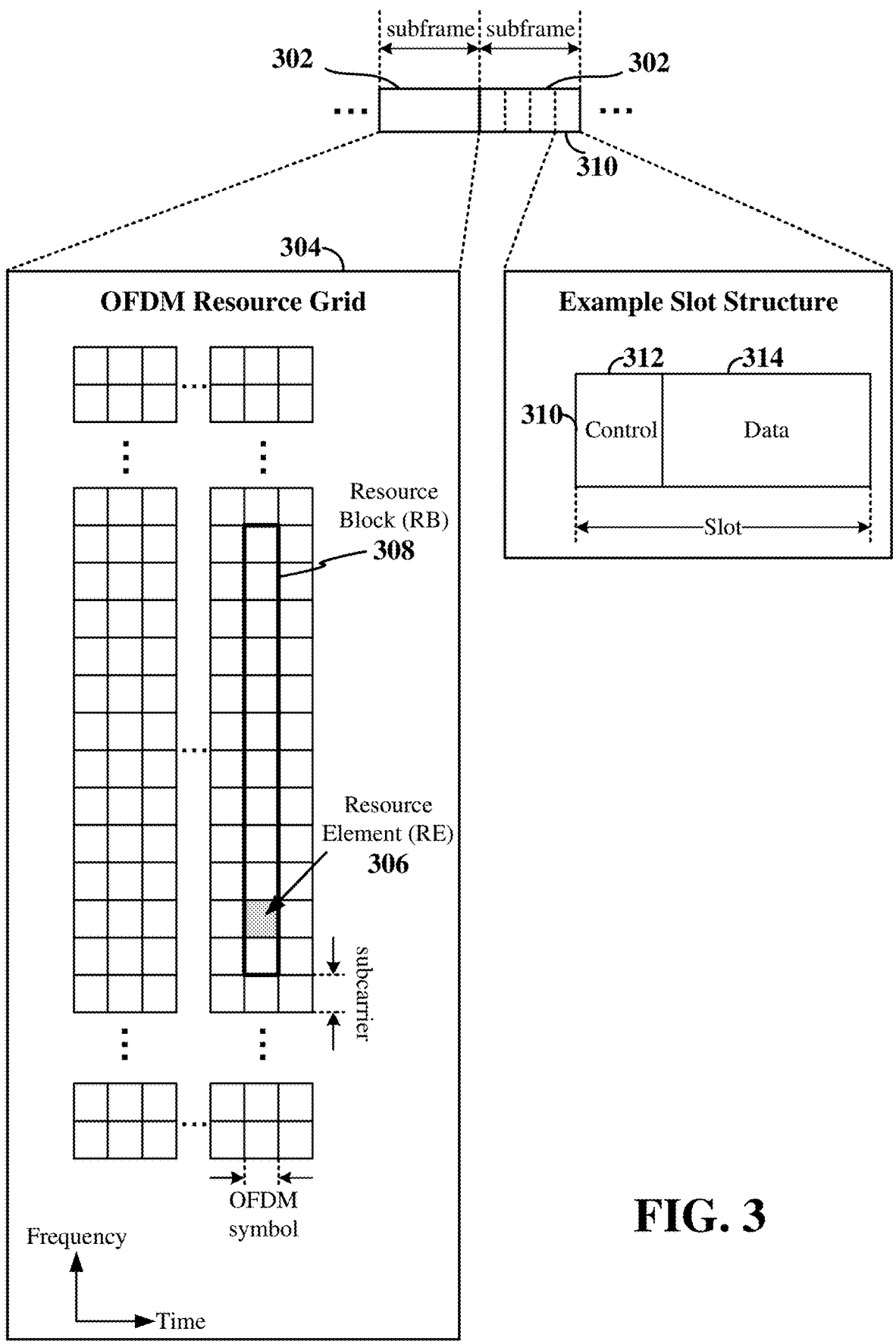
FIG. 3 is a schematic illustration of wireless resources in an air interface utilizing orthogonal frequency divisional multiplexing (OFDM) according to some aspects.

Various aspects of the present disclosure will be described with reference to an OFDM waveform, an example of which is schematically illustrated in FIG. 3. It should be understood by those of ordinary skill in the art that the various aspects of the present disclosure may be applied to an SC-FDMA waveform in substantially the same way as described herein below. That is, while some examples of the present disclosure may focus on an OFDM link for clarity, it should be understood that the same principles may be applied as well to SC-FDMA waveforms.

Referring now to FIG. 3, an expanded view of an example subframe 302 is illustrated, showing an OFDM resource grid. However, as those skilled in the art will readily appreciate, the physical (PHY) layer transmission structure for any particular application may vary from the example described here, depending on any number of factors. Here, time is in the horizontal direction with units of OFDM symbols; and frequency is in the vertical direction with units of subcarriers of the carrier.

The resource grid 304 may be used to schematically represent time-frequency resources for a given antenna port. That is, in a multiple-input-multiple-output (MIMO) implementation with multiple antenna ports available, a corresponding multiple number of resource grids 304 may be available for communication. The resource grid 304 is divided into multiple resource elements (REs) 306. An RE, which is 1 subcarrier×1 symbol, is the smallest discrete part of the time-frequency grid, and contains a single complex value representing data from a physical channel or signal. Depending on the modulation utilized in a particular implementation, each RE may represent one or more bits of information. In some examples, a block of REs may be referred to as a physical resource block (PRB) or more simply a resource block (RB) 308, which contains any suitable number of consecutive subcarriers in the frequency domain. In one example, an RB may include 12 subcarriers, a number independent of the numerology used. In some examples, depending on the numerology, an RB may include any suitable number of consecutive OFDM symbols in the time domain. Within the present disclosure, it is assumed that a single RB such as the RB 308 entirely corresponds to a single direction of communication (either transmission or reception for a given device).

A set of continuous or discontinuous resource blocks may be referred to herein as a Resource Block Group (RBG), sub-band, or bandwidth part (BWP). A set of sub-bands or BWPs may span the entire bandwidth. Scheduling of scheduled entities (e.g., UEs) for downlink, uplink, or sidelink transmissions typically involves scheduling one or more resource elements 306 within one or more sub-bands or bandwidth parts (BWPs). Thus, a UE generally utilizes only a subset of the resource grid 304. In some examples, an RB may be the smallest unit of resources that can be allocated to a UE. Thus, the more RBs scheduled for a UE, and the higher the modulation scheme chosen for the air interface, the higher the data rate for the UE. The RBs may be scheduled by a scheduling entity, such as a base station (e.g., gNB, eNB, etc.), or may be self-scheduled by a UE implementing D2D sidelink communication.

In this illustration, the RB 308 is shown as occupying less than the entire bandwidth of the subframe 302, with some subcarriers illustrated above and below the RB 308. In a given implementation, the subframe 302 may have a bandwidth corresponding to any number of one or more RBs 308. Further, in this illustration, the RB 308 is shown as occupying less than the entire duration of the subframe 302, although this is merely one possible example.

Each 1 ms subframe 302 may consist of one or multiple adjacent slots. In the example shown in FIG. 3, one subframe 302 includes four slots 310, as an illustrative example. In some examples, a slot may be defined according to a specified number of OFDM symbols with a given cyclic prefix (CP) length. For example, a slot may include 7 or 14 OFDM symbols with a nominal CP. Additional examples may include mini-slots, sometimes referred to as shortened transmission time intervals (TTIs), having a shorter duration (e.g., one to three OFDM symbols). These mini-slots or shortened transmission time intervals (TTIs) may in some cases be transmitted occupying resources scheduled for ongoing slot transmissions for the same or for different UEs. Any number of resource blocks may be utilized within a subframe or slot.

An expanded view of one of the slots 310 illustrates the slot 310 including a control region 312 and a data region 314. In general, the control region 312 may carry control channels, and the data region 314 may carry data channels. Of course, a slot may contain all DL, all UL, or at least one DL portion and at least one UL portion. The structure illustrated in FIG. 3 is merely an example, and different slot structures may be utilized, and may include one or more of each of the control region(s) and data region(s).

Although not illustrated in FIG. 3, the various REs 306 within an RB 308 may be scheduled to carry one or more physical channels, including control channels, shared channels, data channels, etc. Other REs 306 within the RB 308 may also carry pilots or reference signals. These pilots or reference signals may provide for a receiving device to perform channel estimation of the corresponding channel, which may enable coherent demodulation/detection of the control and/or data channels within the RB 308.

In some examples, the slot 310 may be utilized for broadcast, multicast, groupcast, or unicast communication. For example, a broadcast, multicast, or groupcast communication may refer to a point-to-multipoint transmission by one device (e.g., a base station, UE, or other similar device) to other devices. Here, a broadcast communication is delivered to all devices, whereas a multicast or groupcast communication is delivered to multiple intended recipient devices. A unicast communication may refer to a point-to-point transmission by a one device to a single other device.

In an example of cellular communication over a cellular carrier via a Uu interface, for a DL transmission, the scheduling entity (e.g., a base station) may allocate one or more REs 306 (e.g., within the control region 312) to carry DL control information including one or more DL control channels, such as a physical downlink control channel (PDCCH), to one or more scheduled entities (e.g., UEs). The PDCCH carries downlink control information (DCI) including but not limited to power control commands (e.g., one or more open loop power control parameters and/or one or more closed loop power control parameters), scheduling information, a grant, and/or an assignment of REs for DL and UL transmissions. The PDCCH may further carry hybrid automatic repeat request (HARQ) feedback transmissions such as an acknowledgment (ACK) or negative acknowledgment (NACK). HARQ is a technique well-known to those of ordinary skill in the art, wherein the integrity of packet transmissions may be checked at the receiving side for accuracy, e.g., utilizing any suitable integrity checking mechanism, such as a checksum or a cyclic redundancy check (CRC). If the integrity of the transmission is confirmed, an ACK may be transmitted, whereas if not confirmed, a NACK may be transmitted. In response to a NACK, the transmitting device may send a HARQ retransmission, which may implement chase combining, incremental redundancy, etc.

The base station may further allocate one or more REs 306 (e.g., in the control region 312 or the data region 314) to carry other DL signals, such as a demodulation reference signal (DMRS); a phase-tracking reference signal (PT-RS); a channel state information (CSI) reference signal (CSI-RS); and a synchronization signal block (SSB). SSBs may be broadcast at regular intervals based on a periodicity (e.g., 5, 10, 20, 30, 80, or 130 ms). An SSB includes a primary synchronization signal (PSS), a secondary synchronization signal (SSS), and a physical broadcast control channel (PBCH). A UE may utilize the PSS and SSS to achieve radio frame, subframe, slot, and symbol synchronization in the time domain, identify the center of the channel (system) bandwidth in the frequency domain, and identify the physical cell identity (PCI) of the cell.

The PBCH in the SSB may further include a master information block (MIB) that includes various system information, along with parameters for decoding a system information block (SIB). The SIB may be, for example, a SystemInformationType 1 (SIB1) that may include various additional (remaining) system information. The MIB and SIB 1 together provide the minimum system information (SI) for initial access. Examples of system information transmitted in the MIB may include, but are not limited to, a subcarrier spacing (e.g., default downlink numerology), system frame number, a configuration of a PDCCH control resource set (CORESET) (e.g., PDCCH CORESET0), a cell barred indicator, a cell reselection indicator, a raster offset, and a search space for SIB1. Examples of remaining minimum system information (RMSI) transmitted in the SIB 1 may include, but are not limited to, a random access search space, a paging search space, downlink configuration information, and uplink configuration information. A base station may transmit other system information (OSI) as well.

In an UL transmission, the scheduled entity (e.g., UE) may utilize one or more REs 306 to carry UL control information (UCI) including one or more UL control channels, such as a physical uplink control channel (PUCCH), to the scheduling entity. UCI may include a variety of packet types and categories, including pilots, reference signals, and information configured to enable or assist in decoding uplink data transmissions. Examples of uplink reference signals may include a sounding reference signal (SRS) and an uplink DMRS. In some examples, the UCI may include a scheduling request (SR), i.e., request for the scheduling entity to schedule uplink transmissions. Here, in response to the SR transmitted on the UCI, the scheduling entity may transmit downlink control information (DCI) that may schedule resources for uplink packet transmissions. UCI may also include HARQ feedback, channel state feedback (CSF), such as a CSI report, or any other suitable UCI.

In addition to control information, one or more REs 306 (e.g., within the data region 314) may be allocated for data traffic. Such data traffic may be carried on one or more traffic channels, such as, for a DL transmission, a physical downlink shared channel (PDSCH); or for an UL transmission, a physical uplink shared channel (PUSCH). In some examples, one or more REs 306 within the data region 314 may be configured to carry other signals, such as one or more SIBs and DMRSs.

In an example of sidelink communication over a sidelink carrier via a proximity service (ProSe) PC5 interface, the control region 312 of the slot 310 may include a physical sidelink control channel (PSCCH) including sidelink control information (SCI) transmitted by an initiating (transmitting) sidelink device (e.g., a transmitting (Tx) V2X device or other Tx UE) towards a set of one or more other receiving sidelink devices (e.g., a receiving (Rx) V2X device or some other Rx UE). The data region 314 of the slot 310 may include a physical sidelink shared channel (PSSCH) including sidelink data traffic transmitted by the initiating (transmitting) sidelink device within resources reserved over the sidelink carrier by the transmitting sidelink device via the SCI. Other information may further be transmitted over various REs 306 within slot 310. For example, HARQ feedback information may be transmitted in a physical sidelink feedback channel (PSFCH) within the slot 310 from the receiving sidelink device to the transmitting sidelink device. In addition, one or more reference signals, such as a sidelink SSB, a sidelink CSI-RS, a sidelink SRS, and/or a sidelink positioning reference signal (PRS) may be transmitted within the slot 310.

These physical channels described above are generally multiplexed and mapped to transport channels for handling at the medium access control (MAC) layer. Transport channels carry blocks of information called transport blocks (TB). The transport block size (TBS), which may correspond to a number of bits of information, may be a controlled parameter, based on the modulation and coding scheme (MCS) and the number of RBs in a given transmission.

The channels or carriers described above with reference to FIGS. 1-3 are not necessarily all of the channels or carriers that may be utilized between a scheduling entity and scheduled entities, and those of ordinary skill in the art will recognize that other channels or carriers may be utilized in addition to those illustrated, such as other traffic, control, and feedback channels.

Figure 4A:
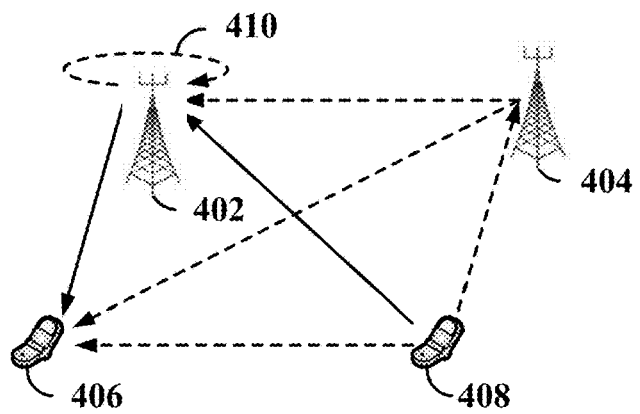
FIG. 4A is a schematic illustration of a wireless communication network and sources of interference for a transmission from a full-duplex (FD) gNB to a half-duplex (HD) user equipment (UE) according to some aspects.
Figure 4B:
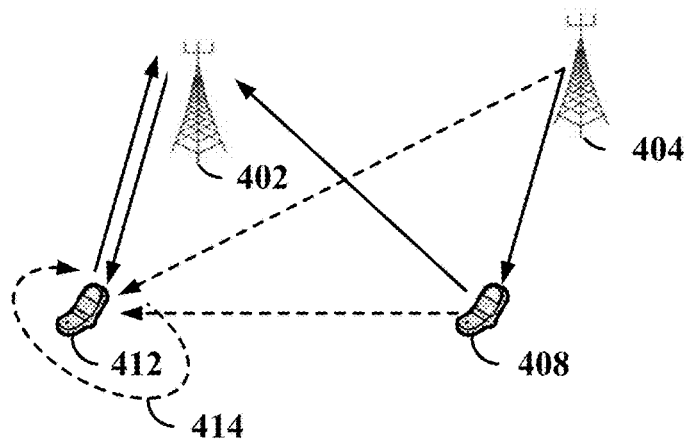
FIG. 4B is a schematic illustration of a wireless communication network and sources of interference for a transmission from an FD gNB to an FD user equipment (UE) according to some aspects.
Figure 4C:
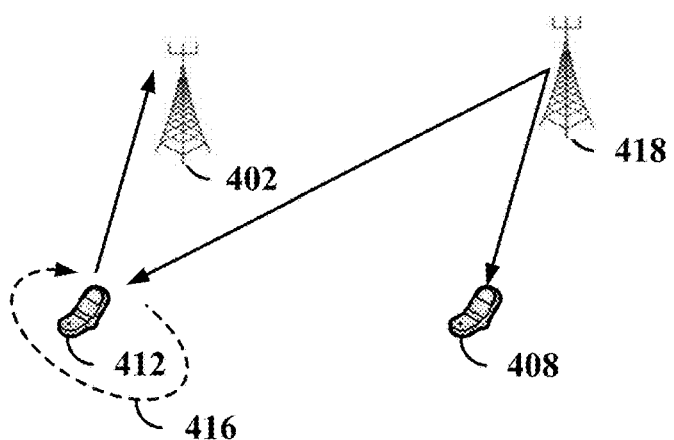
FIG. 4C is a schematic illustration of a wireless communication network and sources of interference for a transmission from an FD UE to an FD gNB according to some aspects.

As mentioned above, a UE and a base station (e.g., gNB) may use full-duplex communication. FIGS. 4A, 4B, and 4C are schematic illustrations of a wireless communication network and sources of interference for a full-duplex gNB 402 (e.g., a scheduling entity), a half-duplex UE 406, a first full-duplex UE 412, and a second full-duplex UE 408 according to some aspects of the disclosure. The UE 406, 408, or 412 may correspond to any of the UEs or scheduled entities shown in any of FIGS. 1, 2, 6A, 6B, 7, 10, 11, 12, and 13.

In FIG. 4A, the full-duplex gNB 402 is transmitting to the half-duplex UE 406. During the time of the transmission from the full-duplex gNB 402 to the half-duplex UE 406, the full-duplex gNB 402 is receiving, at its receiver (not shown), self-interference 410 from its own transmission to the half-duplex UE 406 as well as interference from a neighboring gNB 404 and an uplink transmission from the second full-duplex UE 408. The half-duplex UE 406 is also receiving interference from the second full-duplex UE 408 and the neighboring gNB 404. Because it is a half-duplex UE, the half-duplex UE 406 is not transmitting during the time of the transmission from the full-duplex gNB 402 to the half-duplex UE 406, and therefore, the half-duplex UE 406 receives no self-interference.

In FIG. 4B, the full-duplex gNB 402 is transmitting a downlink transmission to the first full-duplex UE 412. During the time of the transmission of the downlink transmission from the full-duplex gNB 402 to the first full-duplex UE 412, the full-duplex gNB 402 is receiving, at its receiver (not shown), a simultaneous uplink transmission from the first full-duplex UE 412. At the same time as the just mentioned simultaneous downlink and uplink transmissions, the first full-duplex UE 412 is receiving, at its receiver (not shown), self-interference 414 from its own transmission to the full-duplex gNB 402 as well as interference from the neighboring gNB 404 and interference from the second full-duplex UE 408.

In FIG. 4C, the full-duplex gNB 402 is receiving an uplink transmission from the first full-duplex UE 412. During the time of the transmission of the uplink transmission to the full-duplex gNB 402, the first full-duplex UE 412 is also receiving a transmission from a multi-transmission and reception point (TRP) station (e.g., a macro-cell, small cell, pico-cell, femto-cell, remote radio head, relay node, etc.), here represented as a multi-TRP wireless transceiver station 418. In addition to the signal received from the multi-TRP wireless transceiver station 418, the first full-duplex UE 412 is also receiving, at its receiver (not shown), self-interference 416 from its own transmission to the full-duplex gNB 402. The gNB 402, the gNB 404, or the multi-TRP wireless transceiver station 418 may correspond to any of the base stations or scheduling entities shown in any of FIGS. 1, 2, 6A, 6B, 7, 10, 11, 12, and 16.

For the half-duplex UE 406 of FIG. 4A, interference may be mitigated if the interference from the neighboring gNB 404 and second full-duplex UE 408 are at frequencies other than those occupied by the downlink transmission from the full-duplex gNB 402 to the half-duplex UE 406. Similarly, for the first full-duplex UE 412 of FIGS. 4B and 4C, interference may be mitigated if the self-interference 416 from the first full-duplex UE 412, interference from the neighboring gNB 404, and/or interference from the second full-duplex UE 408 are at frequencies other than those occupied by the downlink transmission from the full-duplex gNB 402 to the half-duplex UE 406.

Figures 5A, 5B:
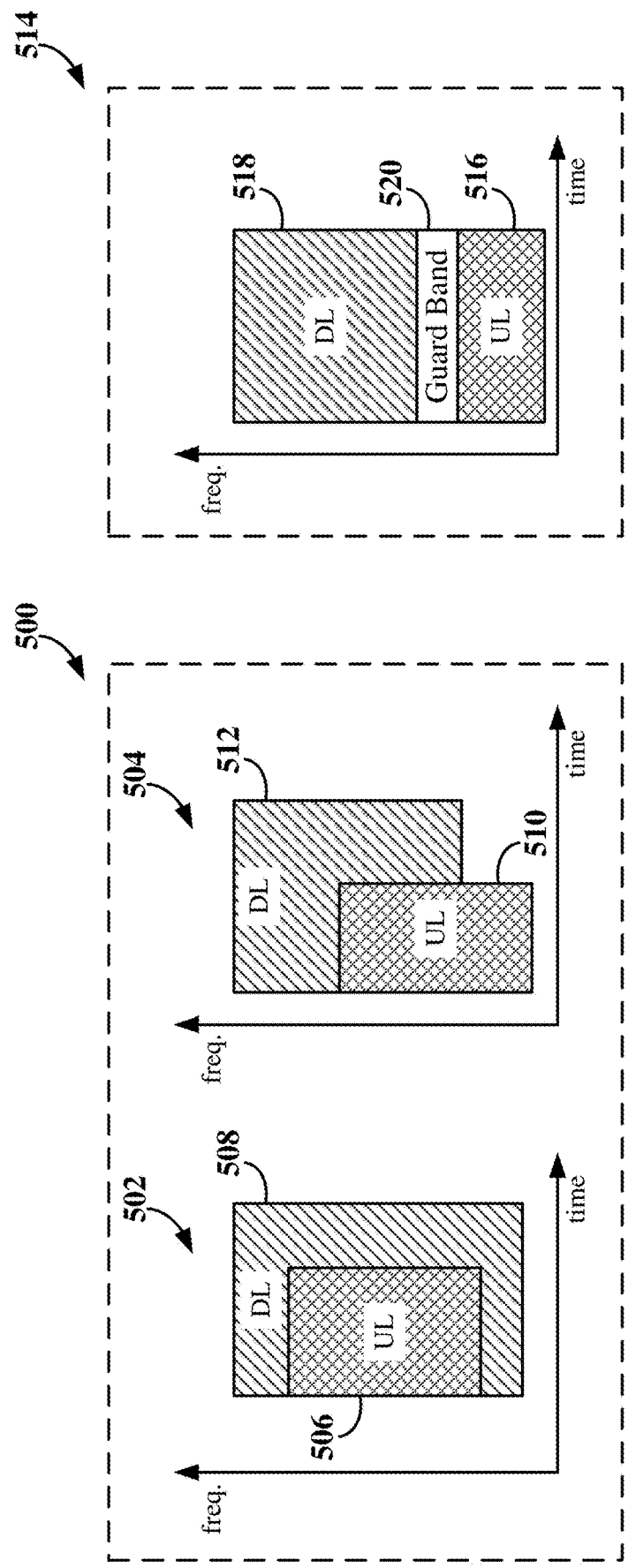
FIG. 5A is a diagram illustrating two examples of inter-band full-duplex (IBID) resources according to some aspects.
FIG. 5B is a diagram illustrating an example of sub-band full-duplex (SBFD) resources according to some aspects.

Various examples of full-duplex operation are illustrated in FIGS. 5A and 5B. FIG. 5A is a diagram illustrating two examples of inter-band full-duplex (IBFD) resources 500 according to some aspects of the disclosure. In the examples shown in FIG. 5A, time is illustrated along the horizontal axis while frequency is illustrated along the vertical axis. A first example 502 of IBFD is depicted on the left while a second example 504 is depicted on the right. In the first example 502, the UL time-frequency resources 506 completely overlap with a portion of the DL time-frequency resources 508. In the second example 504, the UL time-frequency resources 510 partially overlap with a portion of the DL time-frequency resources 512. Accordingly, a device, for example a base station and/or a scheduled entity, employing IBFD may transmit and receive on the same time and frequency resources. That is, the device may transmit and receive at the same time(s) at the same frequency (or frequencies). The UL and DL share the same time and frequency resources. The overlap in time-frequency resources may be complete (full overlap), as in the first example 502, or partial, as in the second example 504.

FIG. 5B is a diagram illustrating an example of sub-band full-duplex (SBFD) (e.g., which may be referred to as xDD or sub-band FDD) resources 514 according to some aspects of the disclosure. In the example shown in FIG. 5B, time is illustrated along the horizontal axis while frequency is illustrated along the vertical axis. In SBFD, a device may transmit and receive at the same time but on different frequency resources (e.g., within the same carrier bandwidth). In some examples, the different frequency resources may be in unpaired spectrum. The UL resources 516 are separated from the DL resources 518 by a guard band 520. In some scenarios, the guard band 520 may be relatively narrow (e.g., a few RBs). Consequently, a transmission in the UL resources 516 may result in leakage in the DL resources 518, and vice versa.

FIGS. 6A and 6B illustrate that a wireless communication device (e.g., a base station, a UE, etc.) may use multiple antenna panels to support full-duplex communication. FIG. 6A is a schematic diagram depicting an antenna array 600 of a TRP atop a base station 602 according to some aspects of the disclosure. The antenna array 600 is divided into two panels (panel 1 604, panel 2 606) with a physical separation 608 therebetween. Each of the two panels may be a subarray of antennas. A given panel may transmit and/or receive a beam or a beam group. A different number of panels may be used in other examples.

Other types of devices may include multi-panel antenna arrays for full-duplex communication. For example, a UE may have a first panel on one side of the UE and a second panel on an opposite side of the UE. As another example, a UE may have four panels, with one panel on each corner of the UE.

FIG. 6B is a diagram depicting an example of a transmission and reception configuration of the two panels (panel 1 604 and panel 2 606 of FIG. 6A or two panels on a UE, etc.). The transmission (TX) and reception (RX) configurations of the two panels are depicted for various DL and UL channels as may be implemented in a device (e.g., a scheduling entity or a scheduled entity) implementing flexible TDD according to some aspects of the disclosure.

As mentioned above, flexible TDD may involve in some examples using two panels to operate in either a TDD mode (with both panels on the gNB and one or more panels on the UE configured for either DL or UL) or an SBFD mode (with one panel on each of the gNB and UE configured for UL and another panel on each of the gNB and UE configured for DL) as described below with reference to FIG. 6B.

At the left of FIG. 6B, when the antenna array 600 is communicating in only a single direction at a time, both panel 1 604 and panel 2 606 may be configured for the single-direction communication as an example of a TDD mode showing the DL transmission. For example, both panels 604 and 606 may be configured to transmit DL control 610 and DL data 612 as an example of DL transmissions during TDD mode. At the center of FIG. 6B, when the antenna array 600 is switching between downlink and uplink transmissions and/or simultaneously transmitting a combination of downlink and uplink transmissions, panel 1 and panel 2 may be configured to facilitate switching and/or simultaneous transmission. For example, both panels 604 and 606 may be switched to receive UL control 613 upon completion of the DL data 612 within the first slot. At the start of the next slot, the antenna array 600 may be configured for simultaneously transmitting DL data 615 and DL control 617 and receiving UL data 614 (e.g., PUSCH) and UL control 618. In this example, panel 1 604 may be configured for DL transmission (i.e., TX) and panel 2 606 may be configured for UL reception (i.e., RX). For example, panel 1 604 may be configured for DL transmission at both edges of the band and panel 2 606 may be configured for UL reception at the middle of the band for simultaneous transmission of DL data 615 or DL control 617 and reception of either UL data 614 or UL control 618. At the right of FIG. 6B, when the antenna array 600 is only receiving UL data (e.g., PUSCH 620) and UL control 622, both panel 1 604 and panel 2 606 may be configured for UL reception. The antenna array 600 is thus configurable for both TDD and full-duplex operation (e.g., flexible TDD). The physical separation 608 between panel 1 604 and panel 2 606 may provide improved isolation between the panels (e.g., greater than about 50 dB of improved isolation) when compared to two panels without the physical separation 608. Also, as discussed above, the UL resources may be separated from the DL resources by a guard band, further improving the isolation. The above discussion may be applicable to an antenna array in another type of device (e.g., a UE, with the references to DL and UL reversed).

In view of the above, for a slot in which the band is used for both UL and DL transmissions, a corresponding slot format may be defined as a 'D+U' slot (where D stands for DL and U stands for UL). The DL and UL transmissions can occur in overlapping bands (in-band full-duplex) or adjacent bands (sub-band full-duplex). In a given 'D+U' symbol, a half-duplex UE either transmits in the UL band or receives in the DL band. In a given 'D+U' symbol, a full-duplex UE can transmit in the UL band and/or receive in the DL band in the same slot. A 'D+U' slot can contain DL only symbols, UL only symbols, or full-duplex symbols.

As mentioned above, a base station may transmit reference signals that a UE may use for channel estimation or other purposes. For example, for a channel estimation operation, a base station may transmit a CSI-RS to a UE over a specified resource. The UE may thereby generate CSI and report the CSI back to the base station to enable the base station to estimate the channel over that resource. In this way, the base station may better schedule transmissions between the base station and the UE (e.g., the base station may select the frequency band and transmission parameters the UE is to use to receive a downlink transmission).

A base station may transmit CSI-RS configuration information to a UE that specifies the CSI-RS resources and other parameters to be used by the UE to measure CSI-RS and provide a corresponding CSI report. For a CSI-RS transmission, one or more CSI-RS resource sets may be configured. Each CSI-RS resource set may include CSI-RS resource parameters such as, for example, one or more ports (e.g., for a downlink beam), a number of symbols, a time domain allocation, a bandwidth, and/or other suitable parameters.

CSI reporting by a UE may be configured to be periodic, aperiodic, or semi-persistent. In some examples, periodic CSI reporting may be configured via a radio resource control (RRC) configuration sent by a base station, whereby the UE transmits the CSI reports on the PUCCH. In some examples, semi-persistent CSI reporting may be configured via RRC signaling and triggered by a DCI sent by the base station, whereby the UE transmits the CSI reports on the PUSCH. In some examples, semi-persistent CSI reporting may be activated/deactivated via medium access control-control element (MAC-CE) signaling by the base station, whereby the UE transmits the CSI reports on the PUCCH. In some examples, aperiodic CSI reporting may be triggered by the base station via a DCI, whereby the UE transmits the CSI report on the PUSCH.

Figure 7:
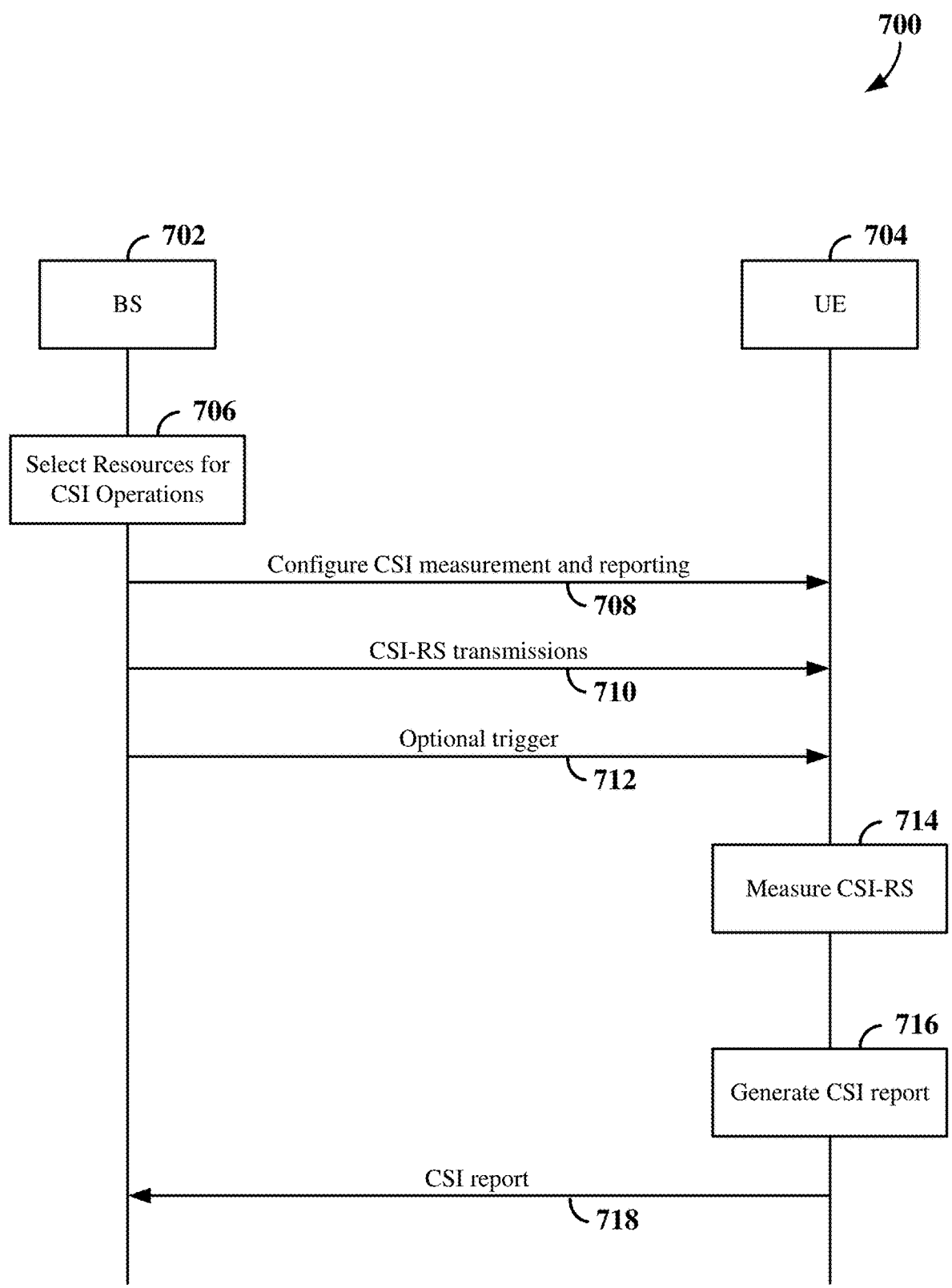
FIG. 7 is a signaling diagram illustrating an example of channel state information-related (CSI-related) signaling between a UE and a base station according to some aspects.

FIG. 7 is a signaling diagram 700 illustrating an example of scheduling a CSI-RS transmission in a wireless communication system including a base station (BS) 702 (or some other scheduling entity) and a user equipment (UE) 704 (or some other scheduled entity). In some examples, the BS 702 may correspond to any of the base stations or scheduling entities shown in any of FIGS. 1, 2, 4A, 4B, 4C, 6A, 6B, 10, 11, 12, and 16. In some examples, the UE 704 may correspond to any of the UEs or scheduled entities shown in any of FIGS. 1, 2, 4A, 4B, 4C, 6A, 6B, 10, 11, 12, and 13.

At 706 of FIG. 7, the BS 702 selects resources for CSI operations (e.g., CSI-RS and CSI transmissions). For example, the BS 702 may specify resources for one or more CSI-RS resource sets to be measured by the UE 704.

At 708, the BS 702 configures CSI-RS operations for the UE 704. For example, the BS 702 may send an RRC message or some other type of message to the UE 704, where the message specifies the resources and other information to be used by the UE 704 for CSI-RS measurements and CSI reporting. In some examples, the BS 702 may transmit configuration information indicating that the UE 704 is to perform periodic, aperiodic, or semi-persistent CSI reporting.

At 710, the BS 702 transmits CSI-RS on the designated CSI-RS resources. At optional 712, in some examples, a DCI or other signaling may be used trigger CSI reporting (e.g., aperiodic CSI reporting) at the UE 704.

At 714, the UE 704 measures the CSI-RS transmissions of 710 and generates CSI based on these measurements. In some examples, this CSI may include rank indicators (RI), precoding matrix indicators (PMI), channel quality information (CQI), and/or other types of information.

At 716, the UE 704 generates a CSI report including the CSI generated at 714. The UE 704 then transmits the CSI-RS report to the BS 702 at 718 (e.g., on uplink resources scheduled by the BS 702 at 708).

Figure 8:
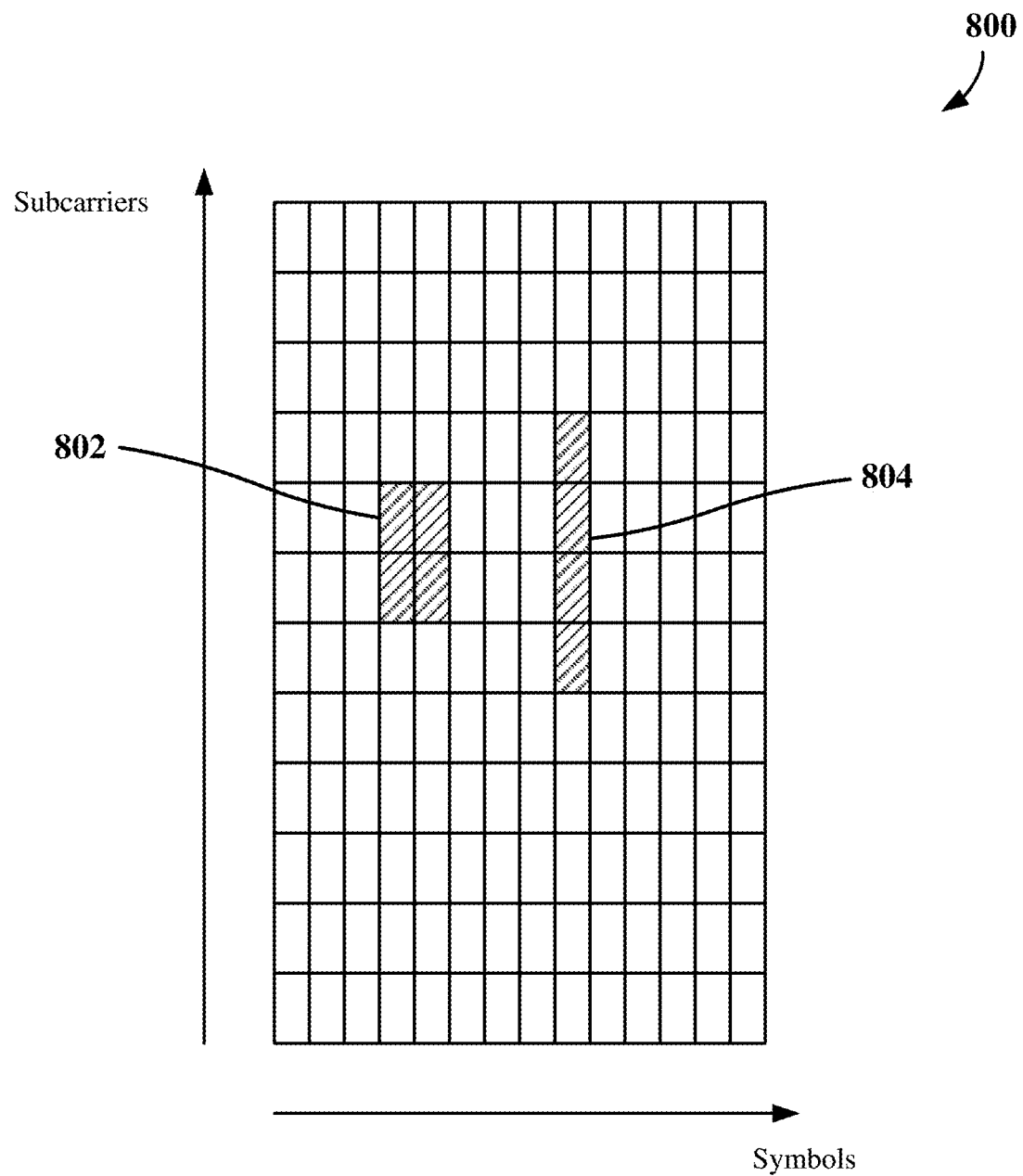
FIG. 8 is a conceptual illustration of examples of channel state information (CSI) interference measurement resources according to some aspects.

In some examples, a base station configures CSI-interference management (CSI-IM) resources to be used by a UE for interference measurements to enable accurate CSI reporting (e.g., reflecting inter-cell interference). FIG. 8 illustrates two example patterns for CSI-IM resources within a resource allocation 800. A first pattern 802 (Pattern 0) consists of two contiguous REs in two contiguous symbols. A second pattern 804 (Pattern 1) consists of four contiguous REs in one symbol. The size of a CSI-IM resource in frequency may be configured by a starting RB parameter (startingRB) and a number of RBs parameter (nofRBs). A CSI report configuration may specify a CSI-IM resource set for interference measurement, where the configured resources are to be used by a UE to measure interference.

As discussed above, uplink control information (UCI) carrying a CSI report may be sent on PUCCH or PUSCH. In some examples, this UCI may consist of one part or two parts depending on the reporting quantity and type (e.g., wideband vs subband reporting). Tables 1 and 2 illustrate an example of a two-part UCI for PUSCH. Here, Table 1 is for CSI part 1 and Table 2 is for CSI part 2. The payload size of CSI part 1 is fixed (e.g., using zero padding) and the size for CSI part 2 can be derived from the information in CSI part 1. Table 3 illustrates an example of a one-part UCI for PUCCH. Table 1 corresponds to Table 6.3.2.1.2-3 of TS 38.212 V16.6.0 (2021-06). Table 2 corresponds to Table 6.3.2.1.2-4 of TS 38.212 V16.6.0 (2021-06). Table 3 corresponds to Table 6.3.1.1.2-7 of TS 38.212 V16.6.0 (2021-06). References within these tables are to TS 38.212 V16.6.0 (2021-06) unless indicated otherwise.

TABLE 1

| CSI report number | CSI fields |
|---|---|
| CSI report #n CSI part 1 | CSI-RS Resources Indicator (CRI) as in Tables 6.3.1.1.2-3/4/6, if reported<br>Rank Indicator as in Tables 6.3.1.1.2-3/4/5 or 6.3.2.1.2-8, if reported<br>Wideband CQI for the first TB as in Tables 6.3.1.1.2-3/4/5 or 6.3.2.1.2-8, if reported<br>Subband differential CQI for the first TB with increasing order of subband number as in Tables 6.3.1.1.2-3/4/5 or 6.3.2.1.2-8, if reported<br>Indicator of the number of non-zero wideband amplitude coefficients $M_0$ for layer 0 as in Table 6.3.1.1.2-5, if reported<br>Indicator of the number of non-zero wideband amplitude coefficients $M_1$ for layer 1 as in Table 6.3.1.1.2-5 (if the rank according to the reported RI is equal to one, this field is set to all zeros), if 2-layer PMI reporting is allowed according to the rank restriction in Clauses 5.2.2.2.3 and 5.2.2.2.4 [6, TS 38.214] and if reported<br>Indicator of the total number of non-zero coefficients summed across all layers $K^{NZ}$ as in Table 6.3.2.1.2-8, if reported |

Note:
Subbands for given CSI report n indicated by the higher layer parameter csi-ReportingBand are numbered continuously in the increasing order with the lowest subband of csi-ReportingBand as subband 0.

TABLE 2

| CSI report number | CSI fields |
|---|---|
| CSI report #n CSI part 2 wideband | Wideband CQI for the second TB as in Tables 6.3.1.1.2-3/4/5, if present and reported<br>Layer Indicator as in Tables 6.3.1.1.2-3/4/5, if reported<br>PMI wideband information fields $X_1$, from left to right as in Tables 6.3.1.1.2-1/2 or 6.3.2.1.2-1/2, if reported<br>PMI wideband information fields $X_2$, from left to right as in Tables 6.3.1.1.2-1/2 or 6.3.2.1.2-1/2, or codebook index for 2 antenna ports according to Clause 5.2.2.2.1 in [6, TS38.214], if pmi-FormatIndicator = widebandPMI and if reported |

TABLE 3

| CSI fields |
|---|
| CRI as in Tables 6.3.1.1.2-3/4, if reported |
| Rank Indicator as in Tables 6.3.1.1.2-3/4, if reported |
| Layer Indicator as in Tables 6.3.1.1.2-3/4, if reported |
| Zero padding bits $O_P$, if needed |
| PMI wideband information fields $X_1$, from left to right as in Tables 6.3.1.1.2-1/2, if reported |
| PMI wideband information fields $X_2$, from left to right as in Tables 6.3.1.1.2-1/2, or codebook index for 2 antenna ports according to Clause 5.2.2.2.1 in [6, TS38.214], if reported |
| Wideband CQI for the first TB as in Tables 6.3.1.1.2-3/4, if reported |
| Wideband CQI for the second TB as in Tables 6.3.1.1.2-3/4, if reported |

As indicated in Tables 1-3, the UCI payload may include fields for information such as a rank indicator (RI), a layer indicator (LI), wideband CQI, subband differential CQI, and the number of non-zero wideband amplitude coefficients. In some examples, the bit width of each of these field in the UCI payload may depend on one or more configuration parameters such as the number of ports, the codebook type, and so on. For example, a wider bit width may be defined for a configuration that uses four antenna ports as compared to a configuration that uses two antenna ports.

The disclosure relates in some aspects to CSI measurement and reporting in scenarios that support different duplexing modes (e.g., full-duplex and half-duplex). In some cases, the channel characteristics of the DL may be different in half-duplex mode as compared to full-duplex mode. For example, some full-duplex mode transmissions may cause cross-link interference (CLI) and/or self-interference at a UE that affects the reception of DL signals at the UE. However, a base station might not effectively take such interference into account when scheduling the UE.

The disclosure relates in some aspects to a UE providing to a base station CSI for full-duplex resources (referred to herein as FD CSI) and CSI for half-duplex resources (referred to herein as HD CSI). In some examples, a base station may use this FD CSI and HD CSI to estimate the impact of different types of interference on a UE when the UE uses a full-duplex slot and a half-duplex slot. For example, the base station may select one set of transmit parameters (e.g., MCS, Rank, etc.) to be used for transmission during a full-duplex mode and a different set of transmit parameters to be used for transmission during a half-duplex mode, thereby improving communication performance for the UE for the different modes. In some examples, a base station may combine the two CSI information sets (FD CSI and HD CSI) to provide one set of transmit parameters (e.g., MCS, Rank, etc.) to be used for all types of slots (e.g., full-duplex and half-duplex slots). In this case, the base station may take both the FD CSI and the HD CSI into account when scheduling a UE, thereby improving communication performance for the UE, without increasing the overhead associated with signaling the corresponding transmit parameters. In some examples, a base station may use the FD CSI and the HD-CSI to make scheduling decisions (e.g., to determine whether to schedule a particular UE in a full-duplex slot). For example, a base station may determine that a UE will likely experience significant interference if scheduled in full-duplex mode. Consequently, the base station may elect to schedule the UE in half-duplex mode to improve communication performance for the UE.

A UE may send the FD CSI and the HD CSI in the same CSI report or in different CSI reports. To reduce the CSI feedback overhead at the UE and the CSI management overhead at the base station when using multiple reports, the base station can configure the UE to report combined and/or compressed CSI. For example, the UE may send the HD CSI in its entirety (e.g., a baseline CSI) and sent the FD CSI as a differential (e.g., a delta) relative to the baseline, or vice versa. Here, the payload for the differential CSI will be less than the payload for the regular CSI, thereby reducing overhead at both the UE and the base station. The UE may send the baseline CSI and the differential CSI in the same report or in different reports. The UE may keep track of two filtering processes for each of these CSI types for periodic CSI-RS (P-CSI-RS) reporting or semi-persistent CSI-RS (SP-CSI-RS) reporting.

For full-duplex communication, there are different scenarios from the perspective of the base station and the UE. From the base station perspective, the base station may communicate with different UEs (e.g., UE 1 and UE 2) in a half-duplex mode (e.g., using a single antenna panel) or in full-duplex mode (e.g., using multiple antenna panels). For the full-duplex mode, the base station may, for example, concurrently transmit to one UE (e.g., UE 1) using one antenna panel and receive from the other UE (e.g., UE 2) using another antenna panel. In both of these cases, a UE may operate in a half-duplex mode (e.g., a half-duplex UE, or a full-duplex-aware UE operating in half-duplex mode). From the UE perspective, the UE may communicate with a given base station in a half-duplex mode (e.g., using a single antenna panel) or in full-duplex mode (e.g., using multiple antenna panels). For the full-duplex mode, the UE may, for example, concurrently transmit to the base station using one antenna panel and receive from the base station using another antenna panel. To report CSI for either of the above scenarios, a UE may send full CSI (e.g., a baseline CSI report) for one duplex mode and send differential CSI (e.g., a delta CSI report) for the other mode.

Figure 9:
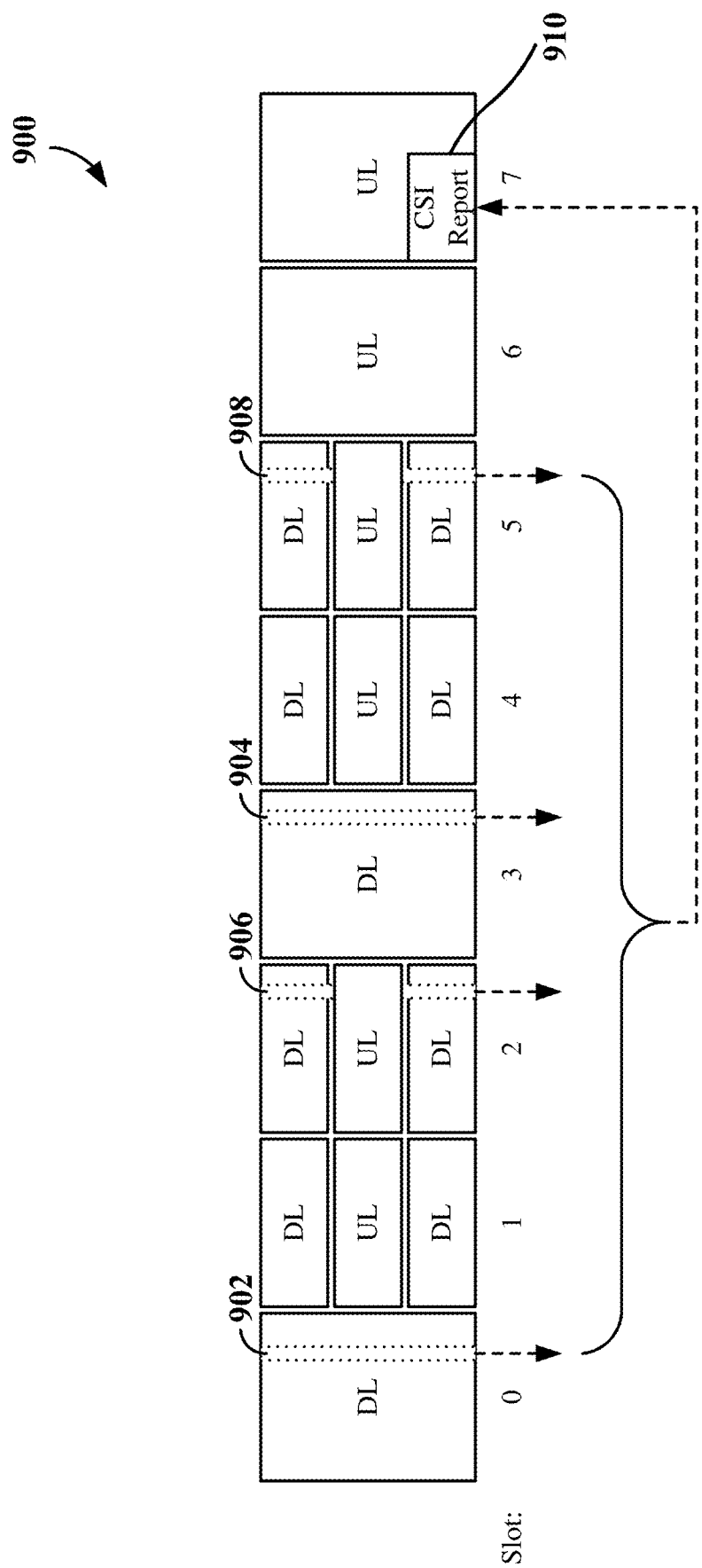
FIG. 9 is a conceptual illustration of an example of CSI reporting based on measurements of full-duplex resources and half-duplex resources according to some aspects.

The disclosure relates in some aspects to a base station configuring a UE to measure HD CSI and FD CSI to provide a CSI report based on the measured CSI. For example, FIG. 9 illustrates a resource allocation 900 that includes half-duplex slots 0, 3, 6, and 7 and full-duplex slots 1, 2, 4, and 5. A base station may generate a configuration that specifies that a UE is to measure CSI-RS 902 and 904 transmitted during half-duplex slots 0 and 3, measure CSI-RS 906 and 908 transmitted during full-duplex slots 2 and 5, and then transmit a CSI report 910 based on these measurements.

Figure 10:
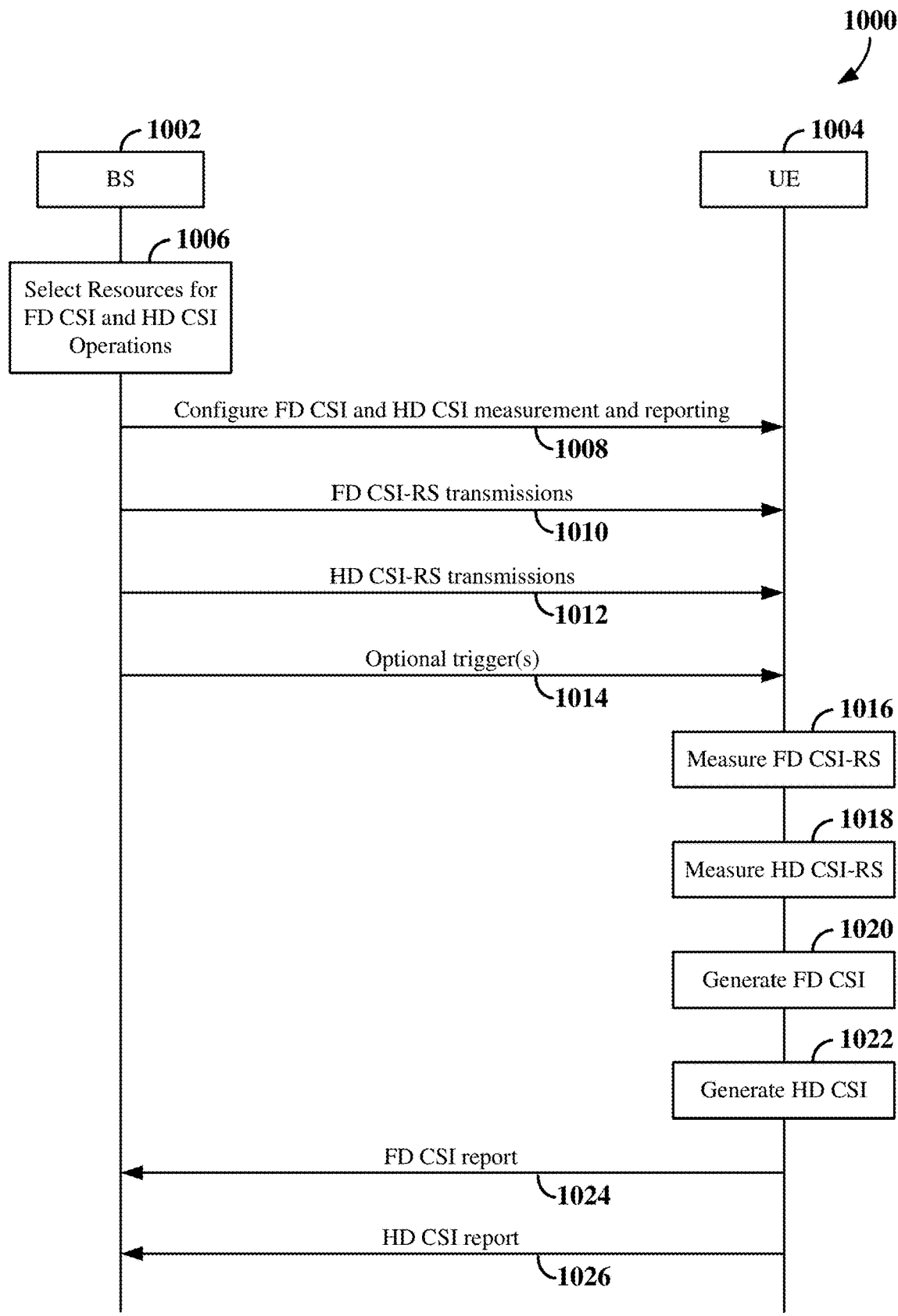
FIG. 10 is a signaling diagram illustrating a first example of full-duplex and half-duplex CSI-related signaling between a UE and a base station according to some aspects.

FIG. 10 is a signaling diagram 1000 illustrating an example of FD CSI and HD CSI measurement and reporting in a wireless communication system including a base station (BS) 1002 (or some other scheduling entity) and a user equipment (UE) 1004 (or some other scheduled entity). In some examples, the BS 1002 may correspond to any of the base stations or scheduling entities shown in any of FIGS. 1, 2, 4A, 4B, 4C, 6A, 6B, 7, 11, 12, and 16. In some examples, the UE 1004 may correspond to any of the UEs or scheduled entities shown in any of FIGS. 1, 2, 4A, 4B, 4C, 6A, 6B, 7, 11, 12, and 13.

At 1006 of FIG. 10, the BS 1002 selects resources for FD CSI operations and HD CSI operations. In some examples, the base station may configure two CSI-RS resource sets. Here, each CSI-RS resource set may be associated with one mode (HD CSI or FD CSI).

At 1008 of FIG. 10, the BS 1002 configures the UE 1004 for FD CSI and HD CSI measurement and reporting. For example, the BS 1002 may send an RRC message or some other type of message to the UE 1004, where the message specifies a first set of resources and other information to be used by the UE 1004 for FD CSI-RS measurements and associated CSI reporting. In addition, this message or another message sent by the BS 1002 may specify a second set of resources and other information to be used by the UE 1004 for HD CSI-RS measurements and associated CSI reporting.

In some examples, the base station may configure two CSI-RS resources in a resource set. In this case, there will be two resources in same slot that include downlink-only (D) symbols and downlink-plus-uplink (D+U) symbols (e.g., special slots). Here, each CSI-RS resource may be associated with one mode (half-duplex or full-duplex).

In some examples, the base station may configure different instances of the same CSI-RS resource. For full-duplex-aware UEs, the UE may have knowledge of the slot type and the UE can therefore filter occurrences of the CSI-RS based on the slot type. Each occurrence of SP-CSI-RS resources or P-CSI-RS resources is associated with one mode (full-duplex or half-duplex). The UE may generate a combined CSI based on occurrences of the SP-CSI-RS resources or the P-CSI-RS resources. In some examples, the UE may generate combined CSI based on occurrences of the same aperiodic CSI-RS resource triggered within a certain window. The window may be defined in terms of slots (e.g., 12 slots) or other suitable duration of time. If a time restriction (e.g., timeRestrictionForChannelMeasurements) is not configured, the UE may maintain two filtering processes, one for each mode.

At 1010 of FIG. 10, the BS 1002 may transmit FD CSI-RS on designated FD CSI-RS resources. At 1012, the BS 1002 may transmit HD CSI-RS on designated HD CSI-RS resources. At optional 1014, in some examples, a DCI or other signaling may be used trigger CSI reporting (e.g., aperiodic CSI reporting) at the UE 1004.

At 1016, the UE 1004 may measure the FD CSI-RS transmissions of 1010 on the designated FD CSI-RS resources (e.g., as indicated to the UE 1004 at 1008). At 1018, the UE 1004 may measure the HD CSI-RS transmissions of 1012 on the designated HD CSI-RS resources (e.g., as indicated to the UE 1004 at 1008).

At 1020, the UE 1004 generates FD CSI based on the measurements of 1016. At 1022, the UE 1004 generates HD CSI based on the measurements of 1018. In some examples, this CSI may include rank indicators (RI), precoding matrix indicators (PMI), channel quality information (CQI), and/or other types of information.

The BS 1002 may configure the UE 1004 to report the FD CSI and the HD CSI in different reports or in the same report. FIG. 10 is an example where the BS 1002 configures the UE 1004 (e.g., at 1008) to report the FD CSI and the HD CSI in different reports. Thus, at 1024, the UE 1004 sends an FD CSI report including the FD CSI generated at 1020 to the BS 1002 (e.g., on uplink resources scheduled by the BS 1002 at 1008). In addition, at 1026, the UE 1004 sends an HD CSI report including the HD CSI generated at 1022 to the BS 1002 (e.g., on uplink resources scheduled by the BS 1002 at 1008).

The disclosure relates in some aspects to a base station configuring a UE to report combined and/or compressed HD CSI and FD CSI. For example, a base station may generate a configuration that specifies that a UE is to combine the measurements of the CSI-RS 902-908 of FIG. 9 into one or two CSI reports 910.

Figure 11:
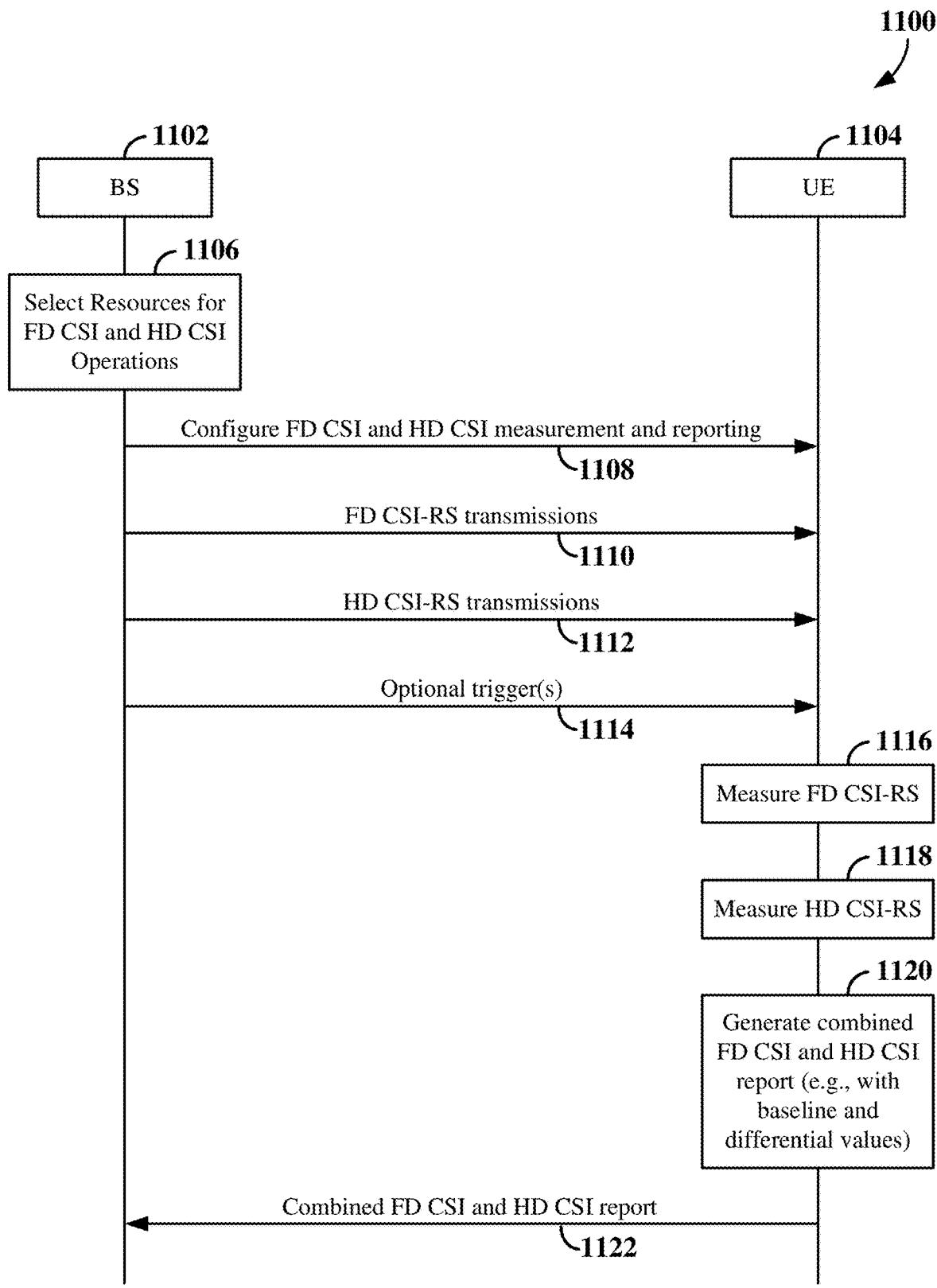
FIG. 11 is a signaling diagram illustrating a second example of full-duplex and half-duplex CSI-related signaling between a UE and a base station according to some aspects.

FIG. 11 is an example where a UE reports FD CSI and HD CSI in a single report. Similar to FIG. 10, FIG. 11 is a signaling diagram 1100 illustrating an example of FD CSI and HD CSI measurement and reporting in a wireless communication system including a base station (BS) 1102 (or some other scheduling entity) and a user equipment (UE) 1104 (or some other scheduled entity). In some examples, the BS 1102 may correspond to any of the base stations or scheduling entities shown in any of FIGS. 1, 2, 4A, 4B, 4C, 6A, 6B, 7, 10, 12, and 16. In some examples, the UE 1104 may correspond to any of the UEs or scheduled entities shown in any of FIGS. 1, 2, 4A, 4B, 4C, 6A, 6B, 7, 10, 12, and 13.

In general, the operations of 1106, 1108, 1110, 1112, 1114, 1116, and 1118 of FIG. 11 may be similar to the operations of 1006, 1008, 1010, 1012, 1014, 1016, and 1018 of FIG. 10, respectively. However, at 1106, the BS 1102 may select resources for a single CSI report in contrast with 1006 of FIG. 10 where the BS 1002 may select resources for a multiple CSI reports. In addition, at 1108, the BS 1102 may configure the UE 1104 to generate a combined FD CSI and HD CSI report in contrast with 1008 of FIG. 10 where the BS 1002 may configure the UE 1004 to send separate reports for FD CSI and HD CSI.

At 1120 of FIG. 11, the UE 1104 generates a combined FD CSI and HD CSI report based on the measurements of 1116 and the measurements of 1118. The UE 1104 then sends the combined FD CSI and HD CSI report to the BS 1102 at 1122.

In some examples, at 1108 of FIG. 11, the base station may configure one report for the two modes (HD CSI and FD CSI), where one CSI is reported as a differential (e.g., delta) with respect to the other CSI (e.g., the baseline CSI). In some examples, this configuration specifies that the differential CSI is included in CSI report part 2 (e.g., Table 2). In some examples, this configuration specifies that a new CSI part 3 is defined for carrying the differential CSI for different modes.

In some examples (e.g., the example of FIG. 10), the base station may configure a UE to send baseline CSI and differential CSI in two reports. Here, the first report (e.g., sent at 1024 of FIG. 10) may include the CSI for one mode and the second report (e.g., sent at 1026 of FIG. 10) may include the delta CSI for other mode.

If two reports are used, the reports may be linked by a configuration or linked in some other manner. In some examples, the reports may be linked by the definition of an aperiodic trigger state for aperiodic CSI reports. In some examples, the reports may be linked based on pre-configured rules (e.g., reports within a given time window are deemed to be linked). In some examples, the reports may be linked by the RRC configuration for periodic or semi-persistent CSI reports.

The disclosure relates in some aspects to a base station configuring a UE to combine two CSI measurements in different slot types (e.g., half-duplex slot and full-duplex slot) in one or two CSI reports that indicate baseline CSI and differential CSI. For example, in FIG. 10, the BS 1002 may send a configuration to the UE 1004 at 1008 specifying that the UE is to combine CSI measurements from different slot types. As another example, in FIG. 11, the BS 1102 may send a configuration to the UE 1104 at 1108 specifying that the UE is to combine CSI measurements from different slot types.

In some examples, the baseline is fixed to be the HD CSI or the FD CSI. For example, the HD CSI may be fixed as the baseline and the FD CSI is reported as differential from the HD CSI. Alternatively, the FD CSI may be fixed as the baseline and the HD CSI is reported as differential from the FD CSI.

In some examples, the baseline is RRC configured. For example, a CSI report RRC configuration (e.g., sent by the BS 1002 at 1008 of FIG. 10 or sent by the BS 1102 at 1108 of FIG. 11) may include a field that specifies whether HD CSI or FD CSI is to be the baseline.

In some examples, the baseline is defined in a CSI trigger state. For example, a base station may configure two trigger states, where the baseline is different in the different trigger states (e.g., HD CSI is the baseline for trigger state 1 and FD CSI is the baseline for trigger state 2).

In some examples, the baseline is defined based on a pre-configured rule. For example, the baseline may be determined based on a rule corresponding to a CSI report ID (e.g., HD CSI is the baseline for ID 1 and FD CSI is the baseline for ID 2), a triggering time, a reporting time, or some other factor.

In some examples, a report quantity data set (e.g., reportQuantity) may be used to indicate the CSI to be reported by a UE. For example, reportQuantity may specify that cri-RI-PMI-CQI is for reporting RI, PMI, and CQI for the CSI-RS indicated by the CSI-RS Resources Indicator (CRI) as shown in Table 4. Such a data set may be defined when reporting the baseline CSI and the differential CSI in two reports or in a single report.

TABLE 4

```
ReportQuantity            CHOICE {
  none                      NULL,
  cri-RI-PMI-CQI            NULL,
  cri-RI-i1                 NULL,
  cri-RI-i1-CQI             SEQUENCE {
    pdsch-BundleSizeForCSI    ENUMERATED {n2, n4}
  },
  cri-RI-CQI                NULL,
  cri-RSRP                  NULL,
  ssb-Index-RSRP            NULL,
  cri-RI-LI--PMI-CQI        NULL
},
```

Multiple CSI reportQuantity data sets may be defined for the scenario where a UE sends the baseline CSI and the differential CSI in two reports. In some examples, if combined CSI is sent in two reports, the base station may define the differential CSI as a new report quantity (e.g., cri-ΔRI-ΔPMI-ΔCQI for reporting the differential (ΔRI, ΔPMI, ΔCQI) for CSI-RS indicated by the CRI). This differential property may apply to all of the reporting types (e.g., CQI, RI, PMI, etc.) or to a subset of these reporting types (e.g., CQI, RI, etc.).

In some examples, if combined CSI is sent in two reports, the base station may define a new field in a CSI report RRC configuration to indicate whether a given report is baseline (legacy) CSI or differential (delta) CSI.

Similarly, multiple CSI reportQuantity data sets may be defined for the scenario where a UE sends the baseline CSI and the differential CSI in a single report. In some examples, if combined CSI is sent in a single report, the base station may define an additional report quantity in the CSI report RRC configuration (e.g., cri-ΔRI-ΔPMI-ΔCQI for reporting differential (ΔRI, ΔPMI, ΔCQI) for CSI-RS indicated by the CRI). This differential property may apply to all of the reporting types (e.g., CQI, RI, PMI, etc.) or to a subset of these reporting types (e.g., CQI, RI, etc.).

In some examples, if combined CSI is sent in a single report, the base station may define a new field in a CSI report RRC configuration to indicate whether the report carries baseline (legacy) CSI and differential (delta) CSI.

As discussed above, a bit width may be defined for CSI payloads. The disclosure relates in some aspects to defining a bit width for a differential CSI payload.

In some examples, the range of the bit width for the differential CSI may be fixed. Alternatively, the bit width may be a dynamic value. In some examples, the bit width may be RRC configured.

In some examples, the bit width may be mapped to a set of values. Thus, a base station may signal one or more bits to indicate a corresponding bit width. For example, a range of ΔCQI {−2,−1,0,1} can be represented with 2 bits. In some examples, the values and/or range (e.g., {−2,−1,0,1}) may be RRC configured. In some examples, the values and/or range may be predefined. In some examples, the values and/or range may be specified by (e.g., fixed by) a wireless communication specification (e.g., a wireless communication standard).

The values and/or range can also depend on other factors. In some examples, the values and/or range may depend on whether HD CSI or FD CSI is deemed to be the baseline. In some examples, the values and/or range may be symmetrical. In some examples, the values and/or range may be asymmetrical.

Some fields may be excluded from a differential report (e.g., if the values are common between baseline CSI and differential CSI). Such fields may include, for example, CRI or ssb-index.

Figure 12:
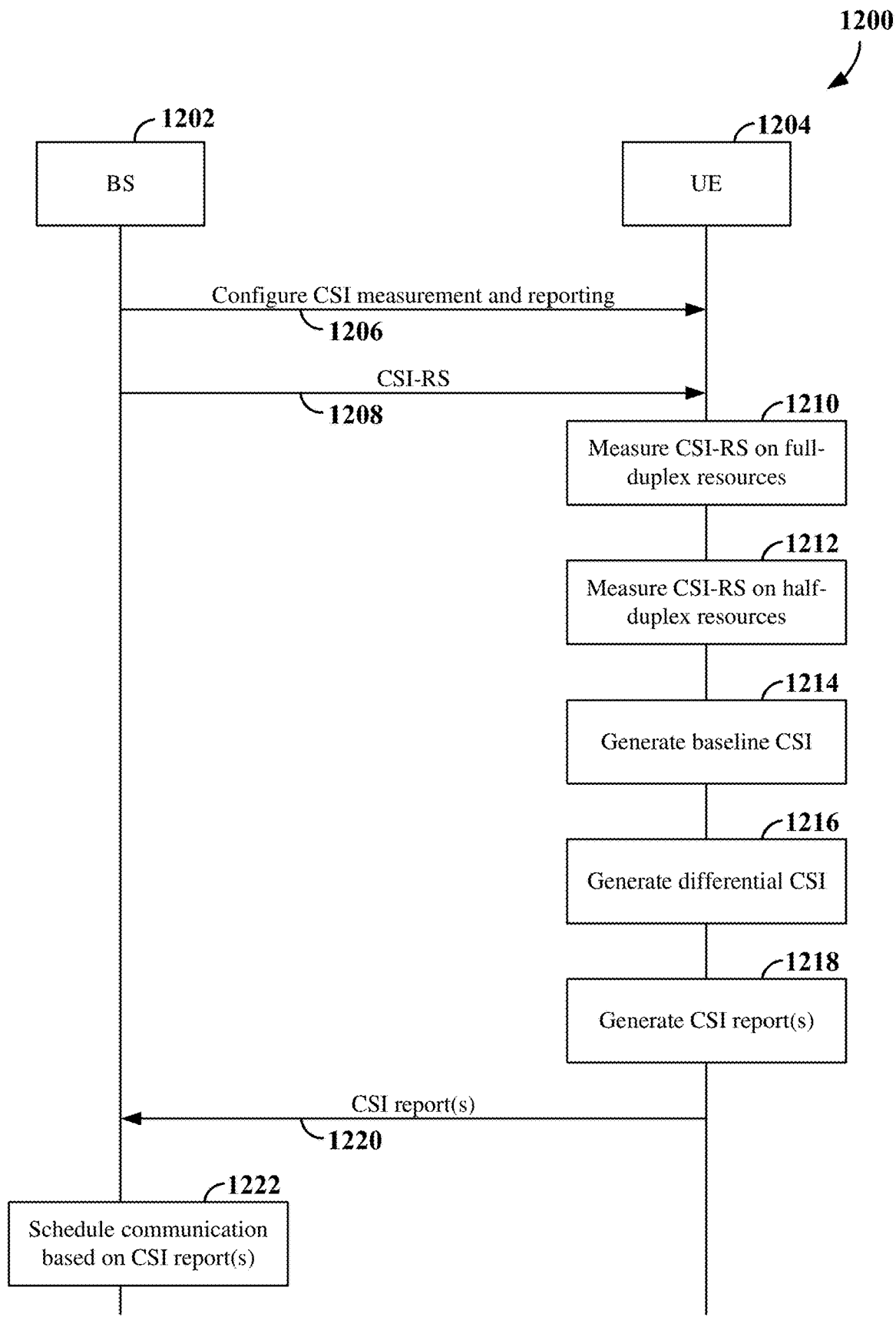
FIG. 12 is a signaling diagram illustrating an example of measurements of full-duplex resources and half-duplex resources and CSI-related signaling between a UE and a base station according to some aspects.

FIG. 12 illustrates an example of CSI-related signaling 1200 in a wireless communication network including a base station (BS) 1202 (or some other scheduling entity) and a user equipment (UE) 1204 (or some other scheduled entity). In some examples, the BS 1202 may correspond to one or more of the BSs or scheduling entities shown in any of FIGS. 1, 2, 4A, 4B, 4C, 6A, 6B, 7, 10, 11, and 16. In some examples, the UE 1204 may correspond to any of the UEs or scheduled entities shown in any of FIGS. 1, 2, 4A, 4B, 4C, 6A, 6B, 7, 10, 11, and 13.

At 1206 of FIG. 12, the BS 1202 configures CSI-RS operations for the UE 1204. For example, the BS 1202 may send an RRC message or some other type of message to the UE 1204, where the message specifies the resources and other information to be used by the UE 1204 for CSI-RS measurements and CSI reporting. In some examples, the BS 1202 may transmit configuration information indicating that the UE 1204 is to measure CSI-RS on full-duplex slots and measure CSI-RS on half-duplex slots. In some examples, the BS 1202 may transmit configuration information indicating that the UE 1204 is to report FD CSI and HD CSI based on these measurements in a single report or in multiple reports. In some examples, the BS 1202 may transmit configuration information indicating that the UE 1204 is to transmit some CSI as a baseline and transmit other CSI as a differential relative to the baseline. In some examples, the BS 1202 may transmit configuration information indicating that the UE 1204 is to perform periodic, aperiodic, or semi-persistent CSI reporting.

At 1208, the BS 1202 transmits CSI-RS on allocated downlink resources. For example, the BS 1202 may transmit CSI-RS on full-duplex slots and transmit CSI-RS on half-duplex slots.

At 1210, the UE 1204 measures CSI-RS transmissions on at least one configured full-duplex resource. In some examples, the UE 1204 may measure CSI-RS on a full-duplex slot (e.g., using one antenna panel) while concurrently transmitting on the full-duplex slot (e.g., using another antenna panel). Thus, the CSI-RS measurement may include self-interference effects and/or CLI effects.

At 1212, the UE 1204 measures CSI-RS transmissions on at least one configured half-duplex resource. For example, the UE 1204 may measure CSI-RS on a half-duplex slot (e.g., using one antenna panel).

At 1214, the UE 1204 generates baseline CSI based on the measurements at 1210 or 1212. For example, if the FD CSI is designated as the baseline CSI (e.g., by a configuration), the UE 1204 generates the baseline CSI based on the measurements at 1210. Conversely, if the HD CSI is designated as the baseline (e.g., by a configuration), the UE 1204 generates the baseline CSI based on the measurements at 1212. In some examples, this CSI may include rank indicators (RI), precoding matrix indicators (PMI), channel quality information (CQI), and/or other types of information.

At 1216, the UE 1204 generates differential CSI based on the measurements at 1210 or 1212. For example, if the FD CSI is designated as the differential CSI (e.g., by a configuration), the UE 1204 generates the differential CSI based on the measurements at 1210. Conversely, if the HD CSI is designated as the differential CSI (e.g., by a configuration), the UE 1204 generates the differential CSI based on the measurements at 1212. In some examples, this CSI may include delta RI, delta PMI, delta CQI, and/or other types of differential information. For example, the UE 1204 may calculate the RI, PMI, and CQI based on the corresponding CSI-RS measurements and determine the differences between these RI, PMI, and CQI values and the RI, PMI, and CQI values calculated at 1214. These differences (or values representative of these differences) may thus constitute the differential CSI to be reported to the BS 1202.

At 1218, the UE 1204 generates at least one CSI report including the baseline CSI generated at 1214 and the differential CSI generated at 1216. As discussed above, in some examples, the UE 1204 generates a single report that includes the baseline CSI and the differential CSI. In other examples, the UE 1204 generates one report that includes the baseline CSI and generates another report that includes the differential CSI.

At 1220, the UE 1204 transmits the CSI-RS report(s) to the BS 1202. For example, the UE 1204 may transmit each report on uplink resources designated by the BS 1202 for the UE 1204.

At 1224, the BS 1202 schedules communication based on the CSI report(s) received at 1220. For example, since the FD CSI may include the effects of self-interference and/or CLI at the UE 1204, the BS may determine, based on the differences between the channel quality on the full-duplex slots and the half-duplex slots, whether to schedule the UE 1204 on a full-duplex slot (e.g., if the channel quality is significantly worse on the full-duplex slot, the BS 1202 may schedule the UE 1204 on a half-duplex slot). As another example, the BS 1202 may combine (e.g., average, etc.) the FD CSI and the HD CSI to determine transmission parameters for scheduling transmissions on full-duplex slots and half-duplex slots.

Figure 13:
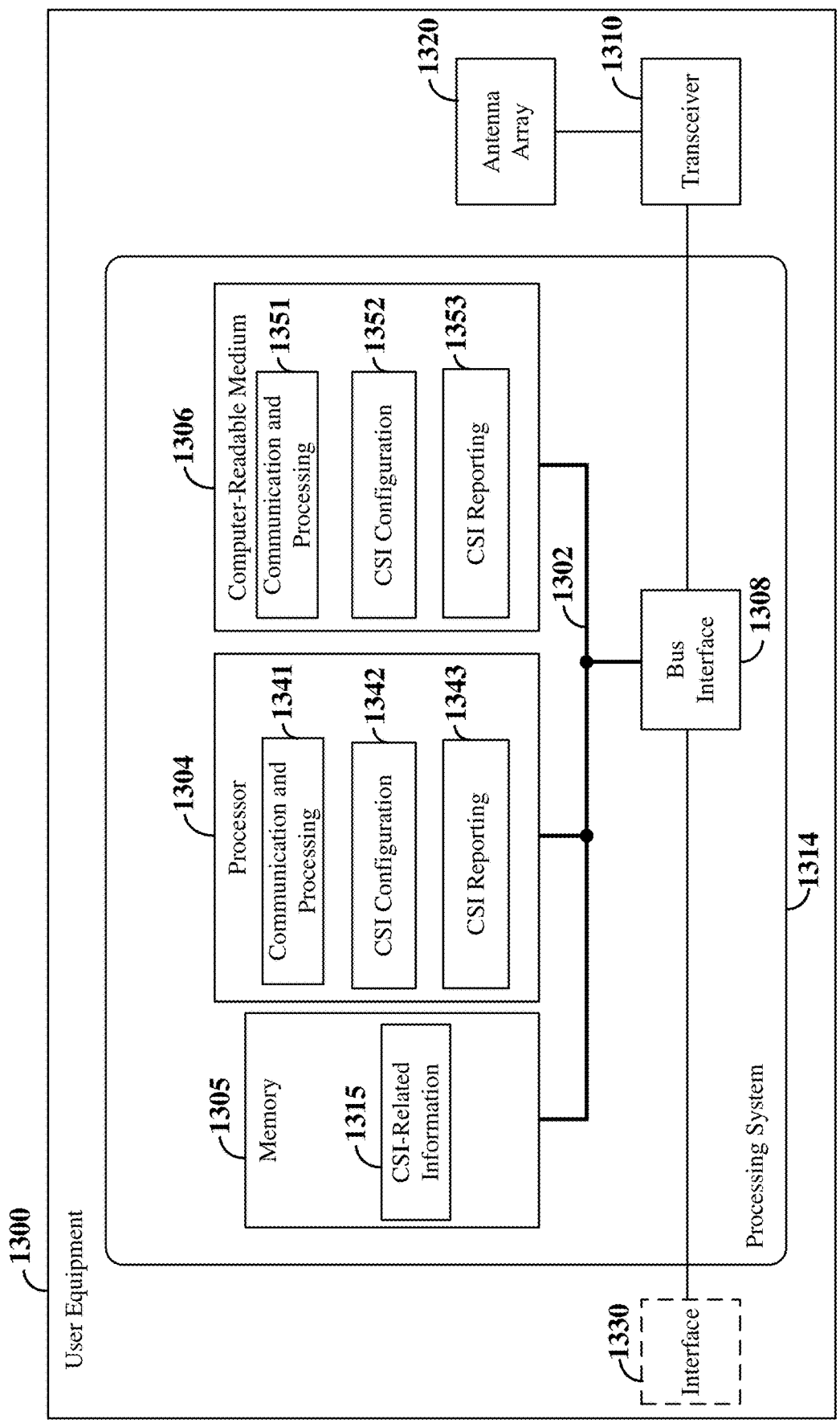
FIG. 13 is a block diagram illustrating an example of a hardware implementation for a user equipment employing a processing system according to some aspects.

FIG. 13 is a block diagram illustrating an example of a hardware implementation for a UE 1300 employing a processing system 1314. For example, the UE 1300 may be a device configured to wirelessly communicate with a base station, as discussed in any one or more of FIGS. 1-12. In some implementations, the UE 1300 may correspond to any of the UEs or scheduled entities shown in any of FIGS. 1, 2, 4A, 4B, 4C, 6A, 6B, 7, 10, 11, and 12.

In accordance with various aspects of the disclosure, an element, or any portion of an element, or any combination of elements may be implemented with the processing system 1314. The processing system 1314 may include one or more processors 1304. Examples of processors 1304 include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. In various examples, the UE 1300 may be configured to perform any one or more of the functions described herein. That is, the processor 1304, as utilized in a UE 1300, may be used to implement any one or more of the processes and procedures described herein.

The processor 1304 may in some instances be implemented via a baseband or modem chip and in other implementations, the processor 1304 may include a number of devices distinct and different from a baseband or modem chip (e.g., in such scenarios as may work in concert to achieve the examples discussed herein). And as mentioned above, various hardware arrangements and components outside of a baseband modem processor can be used in implementations, including RF-chains, power amplifiers, modulators, buffers, interleavers, adders/summers, etc.

In this example, the processing system 1314 may be implemented with a bus architecture, represented generally by the bus 1302. The bus 1302 may include any number of interconnecting buses and bridges depending on the specific application of the processing system 1314 and the overall design constraints. The bus 1302 communicatively couples together various circuits including one or more processors (represented generally by the processor 1304), a memory 1305, and computer-readable media (represented generally by the computer-readable medium 1306). The bus 1302 may also link various other circuits such as timing sources, peripherals, voltage regulators, and power management circuits, which are well known in the art, and therefore, will not be described any further. A bus interface 1308 provides an interface between the bus 1302 and a transceiver 1310 and an antenna array 1320, and between the bus 1302 and an interface 1330. The transceiver 1310 provides a communication interface or means for communicating with various other apparatus over a wireless transmission medium. The interface 1330 provides a communication interface or means of communicating with various other apparatuses and devices (e.g., other devices housed within the same apparatus as the UE or other external apparatuses) over an internal bus or external transmission medium, such as an Ethernet cable. Depending upon the nature of the apparatus, the interface 1330 may include a user interface (e.g., keypad, display, speaker, microphone, joystick). Of course, such a user interface is optional, and may be omitted in some examples, such as an IoT device.

The processor 1304 is responsible for managing the bus 1302 and general processing, including the execution of software stored on the computer-readable medium 1306. The software, when executed by the processor 1304, causes the processing system 1314 to perform the various functions described below for any particular apparatus. The computer-readable medium 1306 and the memory 1305 may also be used for storing data that is manipulated by the processor 1304 when executing software. For example, the memory 1305 may store CSI-related information 1315 (e.g., CSI reference signal resource configurations, CSI measurement configurations, CSI reporting configurations, etc.) used by the processor 1304 for communication operations (e.g., CSI reference signal measurements and CSI reporting) as described herein.

One or more processors 1304 in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise. The software may reside on a computer-readable medium 1306.

The computer-readable medium 1306 may be a non-transitory computer-readable medium. A non-transitory computer-readable medium includes, by way of example, a magnetic storage device (e.g., hard disk, floppy disk, magnetic strip), an optical disk (e.g., a compact disc (CD) or a digital versatile disc (DVD)), a smart card, a flash memory device (e.g., a card, a stick, or a key drive), a random access memory (RAM), a read only memory (ROM), a programmable ROM (PROM), an erasable PROM (EPROM), an electrically erasable PROM (EEPROM), a register, a removable disk, and any other suitable medium for storing software and/or instructions that may be accessed and read by a computer. The computer-readable medium 1306 may reside in the processing system 1314, external to the processing system 1314, or distributed across multiple entities including the processing system 1314. The computer-readable medium 1306 may be embodied in a computer program product. By way of example, a computer program product may include a computer-readable medium in packaging materials. Those skilled in the art will recognize how best to implement the described functionality presented throughout this disclosure depending on the particular application and the overall design constraints imposed on the overall system.

The UE 1300 may be configured to perform any one or more of the operations described herein (e.g., as described above in conjunction with FIGS. 1-12 and as described below in conjunction with FIGS. 14-15). In some aspects of the disclosure, the processor 1304, as utilized in the UE 1300, may include circuitry configured for various functions.

The processor 1304 may include communication and processing circuitry 1341. The communication and processing circuitry 1341 may be configured to communicate with a base station, such as a gNB. The communication and processing circuitry 1341 may include one or more hardware components that provide the physical structure that performs various processes related to wireless communication (e.g., signal reception and/or signal transmission) as described herein. The communication and processing circuitry 1341 may further include one or more hardware components that provide the physical structure that performs various processes related to signal processing (e.g., processing a received signal and/or processing a signal for transmission) as described herein. In some examples, the communication and processing circuitry 1341 may include two or more transmit/receive chains. The communication and processing circuitry 1341 may further be configured to execute communication and processing software 1351 included on the computer-readable medium 1306 to implement one or more functions described herein.

The communication and processing circuitry 1341 may further be configured to generate and transmit a message to the base station. For example, the message may be included in a MAC-CE carried in a PUSCH, UCI in a PUCCH or PUSCH, a random access message, or an RRC message. The communication and processing circuitry 1341 may further be configured to generate and transmit a scheduling request (e.g., via UCI in a PUCCH) to the base station to receive an uplink grant for the PUSCH.

The communication and processing circuitry 1341 may further be configured to generate and transmit an uplink signal. The uplink signal may include, for example, a CSI report, a PUCCH, a PUSCH, an SRS, a DMRS, or a physical random access channel (PRACH).

In some implementations where the communication involves receiving information, the communication and processing circuitry 1341 may obtain information from a component of the UE 1300 (e.g., from the transceiver 1310 that receives the information via radio frequency signaling or some other type of signaling suitable for the applicable communication medium), process (e.g., decode) the information, and output the processed information. For example, the communication and processing circuitry 1341 may output the information to another component of the processor 1304, to the memory 1305, or to the bus interface 1308. In some examples, the communication and processing circuitry 1341 may receive one or more of signals, messages, other information, or any combination thereof. In some examples, the communication and processing circuitry 1341 may receive information via one or more channels. In some examples, the communication and processing circuitry 1341 may include functionality for a means for receiving. In some examples, the communication and processing circuitry 1341 may include functionality for a means for decoding.

In some implementations where the communication involves sending (e.g., transmitting) information, the communication and processing circuitry 1341 may obtain information (e.g., from another component of the processor 1304, the memory 1305, or the bus interface 1308), process (e.g., encode) the information, and output the processed information. For example, the communication and processing circuitry 1341 may output the information to the transceiver 1310 (e.g., that transmits the information via radio frequency signaling or some other type of signaling suitable for the applicable communication medium). In some examples, the communication and processing circuitry 1341 may send one or more of signals, messages, other information, or any combination thereof. In some examples, the communication and processing circuitry 1341 may send information via one or more channels. In some examples, the communication and processing circuitry 1341 may include functionality for a means for sending (e.g., a means for transmitting). In some examples, the communication and processing circuitry 1341 may include functionality for a means for encoding.

In some examples, the communication and processing circuitry 1341 may include functionality for a means for communicating information. For example, the communication and processing circuitry 1341 may be configured to transmit information to a gNB via a scheduled uplink resource (e.g., PUSCH). As another example, the communication and processing circuitry 1341 may be configured to receive information from a gNB via a scheduled downlink resource (e.g., PDSCH).

The processor 1304 may include CSI configuration circuitry 1342 configured to perform CSI configuration-related operations (e.g., as discussed herein in conjunction with FIGS. 7-12). The CSI configuration circuitry 1342 may be configured to execute CSI configuration software 1352 included on the computer-readable medium 1306 to implement one or more functions described herein.

Figure 14:
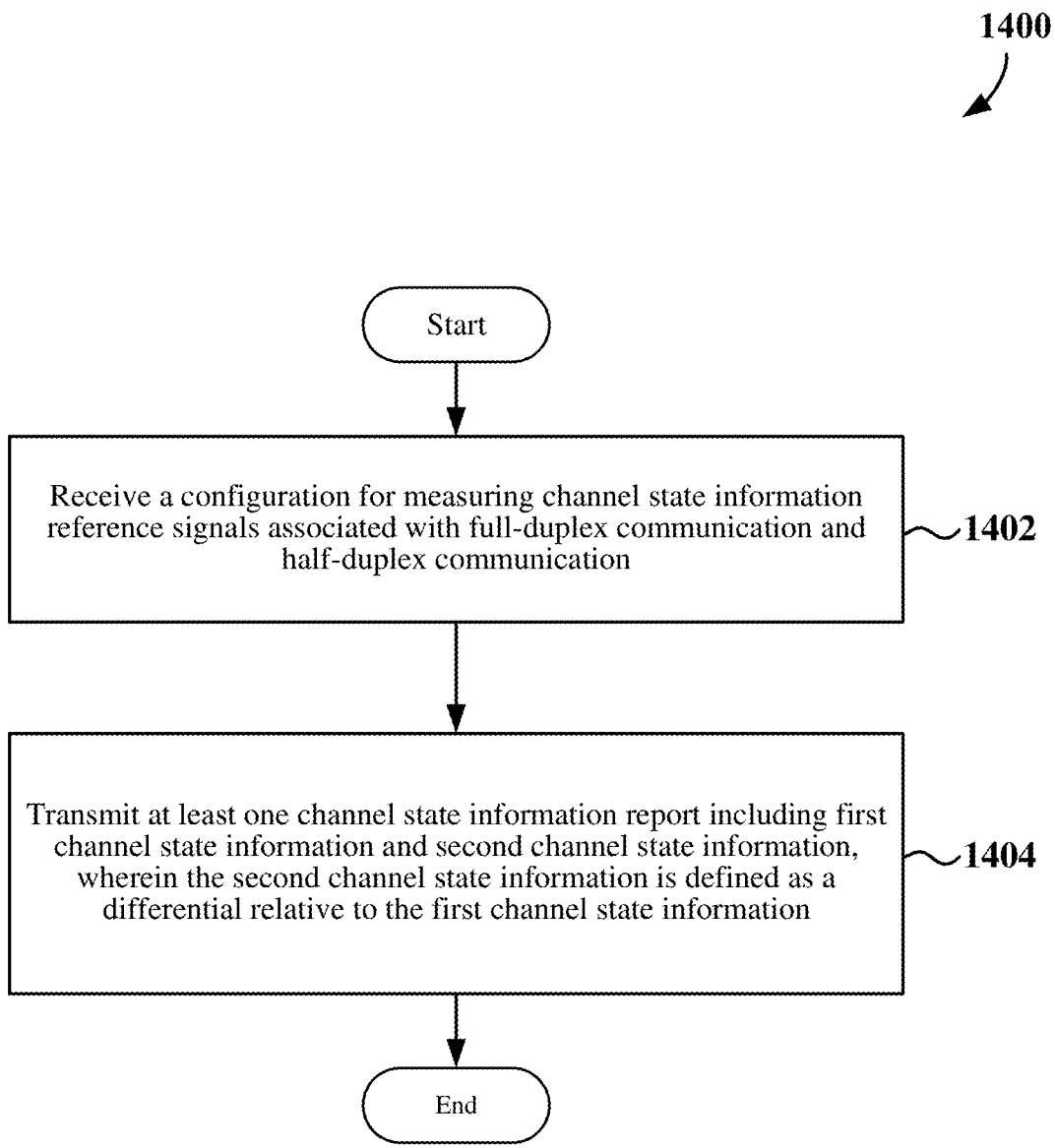
FIG. 14 is a flow chart of an example CSI reporting method according to some aspects.

The CSI configuration circuitry 1342 may include functionality for a means for receiving a configuration (e.g., as discussed at 1008 of FIG. 10, 1108 of FIG. 11, 1206 of FIGS. 12, and/or 1402 of FIG. 14). For example, the CSI configuration circuitry 1342 may be configured to receive a message including a CSI configuration from a gNB via downlink signaling. In addition, the CSI configuration circuitry 1342 may be configured to process the message to recover the CSI configuration.

The processor 1304 may include CSI reporting circuitry 1343 configured to perform CSI reporting-related operations (e.g., as discussed herein in conjunction with FIGS. 7-12). The CSI reporting circuitry 1343 may be configured to execute CSI reporting software 1353 included on the computer-readable medium 1306 to implement one or more functions described herein.

Figure 15:
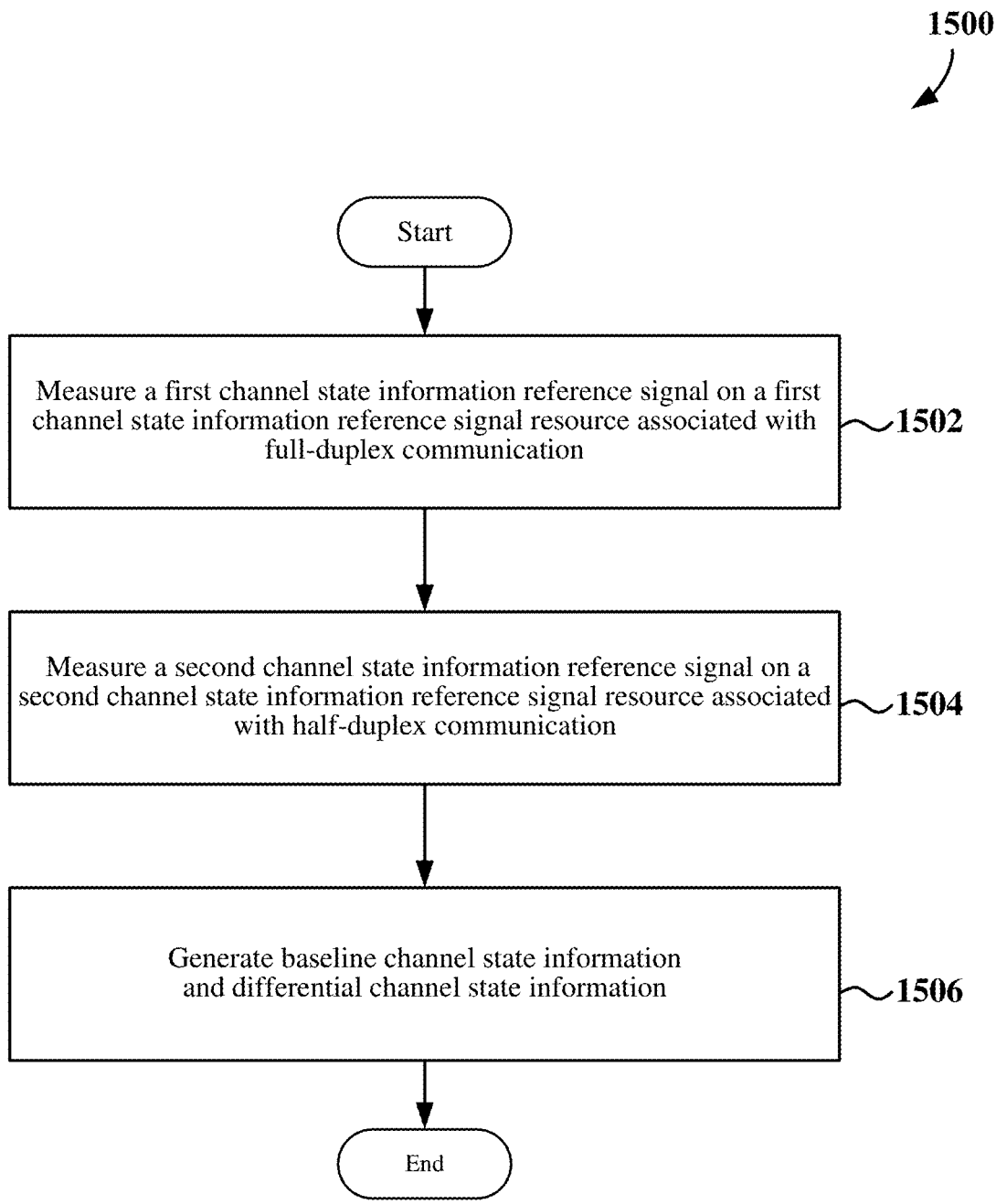
FIG. 15 is a flow chart of an example method for generating CSI according to some aspects.

The CSI reporting circuitry 1343 may include functionality for a means for measuring a CSI-RS (e.g., as discussed at 1010 and 1012 of FIGS. 10, 1110 and 1112 of FIG. 11, 1208 of FIGS. 12, and/or 1502 and 1504 of FIG. 15). For example, the CSI reporting circuitry 1343 may be configured to measure CSI-RS transmissions on downlink resources specified by a gNB.

The CSI reporting circuitry 1343 may include functionality for a means for generating a CSI report (e.g., as discussed at 1020 and 1022 of FIG. 10, 1120 of FIG. 11, 1218 of FIG. 12, 1404 of FIGS. 14, and/or 1506 of FIG. 15). For example, the CSI reporting circuitry 1343 may be configured to measure CSI-RS transmissions and generate CSI based on these measurements. In some examples, the CSI reporting circuitry 1343 may be configured to generate baseline channel state information and differential channel state information based on the CSI-RS measurements.

The CSI reporting circuitry 1343 may include functionality for a means for transmitting a CSI report (e.g., as discussed at 1024 and 1026 of FIG. 10, 1122 of FIG. 11, 1220 of FIGS. 12, and/or 1404 of FIG. 14). For example, the CSI reporting circuitry 1343 may be configured to transmit UCI on an uplink resource (e.g., PUSCH or PUCCH) scheduled for the UE 1300 by a gNB.

FIG. 14 is a flow chart illustrating an example method 1400 for wireless communication (e.g., xDD communication or another form of wireless communication) according to some aspects. As described below, some or all illustrated features may be omitted in a particular implementation within the scope of the present disclosure, and some illustrated features may not be required for implementation of all examples. In some examples, the method 1400 may be carried out by the user equipment 1300 illustrated in FIG. 13 or by any suitable apparatus or means for carrying out the functions or algorithm described below.

At block 1402, a user equipment may receive a configuration for measuring channel state information reference signals associated with full-duplex communication and half-duplex communication. For example, the CSI configuration circuitry 1342 together with the communication and processing circuitry 1341 and the transceiver 1310, shown and described above in connection with FIG. 13, may provide a means to receive a configuration for measuring channel state information reference signals associated with full-duplex communication and half-duplex communication.

In some examples, the configuration indicates a first channel state information reference signal resource set for a first channel state information reference signal associated with the full-duplex communication. In some examples the configuration indicates a second channel state information reference signal resource set for a second channel state information reference signal associated with the half-duplex communication.

In some examples, the configuration indicates a channel state information reference signal resource set that includes a first channel state information reference signal resource for a first channel state information reference signal associated with the full-duplex communication, and a second channel state information reference signal resource for a second channel state information reference signal associated with the half-duplex communication.

In some examples, the configuration indicates a channel state information reference signal resource. In this case, the user equipment may receive a first channel state information reference signal associated with the full-duplex communication on a first instance of the channel state information reference signal resource, and receive a second channel state information reference signal associated with the half-duplex communication on a second instance of the channel state information reference signal resource.

At block 1404, the user equipment may transmit at least one channel state information report including first channel state information and second channel state information, wherein the second channel state information is defined as a differential relative to the first channel state information. For example, the CSI reporting circuitry 1343 together with the communication and processing circuitry 1341 and the transceiver 1310, shown and described above in connection with FIG. 13, may provide a means to transmit at least one channel state information report including first channel state information and second channel state information.

In some examples, the at least one channel state information report is a single channel state information report, the first channel state information is included in a first channel state information part of the single channel state information report, and the second channel state information is included in a second channel state information part of the single channel state information report or in a third channel state information report part of the single channel state information report.

In some examples, the at least one channel state information report may include a first channel state information report for the first channel state information, the first channel state information being indicative of a first measurement of a first channel state information reference signal. In some examples, the at least one channel state information report may include a second channel state information report for the second channel state information, the second channel state information being indicative of a second measurement of a second channel state information reference signal. The second channel state information report may be linked to the first channel state information report based on at least one of an aperiodic trigger state definition, a pre-configured rule, a radio resource control configuration, or a combination thereof.

In some examples, the user equipment may report half-duplex channel state information as a differential relative to full-duplex channel state information. In some examples, the UE may report the full-duplex channel state information as a differential relative to the half-duplex channel state information.

In some examples, the user equipment may determine, based on the configuration, a configured trigger state, or a pre-configured rule, whether half-duplex channel state information is to be reported as a differential relative to full-duplex channel state information. In some examples, the user equipment may determine, based on the configuration, a configured trigger state, or a pre-configured rule, whether the full-duplex channel state information is to be reported as a differential relative to the half-duplex channel state information.

In some examples, the at least one channel state information report may include a first channel state information report for the first channel state information and a second channel state information report for the second channel state information. In some examples, the configuration specifies a first channel state information report quantity for the first channel state information, and a second channel state information report quantity, different from the first channel state information report quantity, for the second channel state information.

In some examples, the at least one channel state information report may include a first channel state information report for the first channel state information and a second channel state information report for the second channel state information. In some examples, the configuration specifies that the first channel state information report includes baseline information or that the second channel state information report includes differential information.

In some examples, the at least one channel state information report may include a single channel state information report. In some examples, the configuration specifies a first channel state information report quantity for the first channel state information, and a second channel state information report quantity, different from the first channel state information report quantity, for the second channel state information.

In some examples, the at least one channel state information report may include a single channel state information report. In some examples, the configuration specifies that the single channel state information report includes baseline information and differential information.

In some examples, the user equipment may use a defined bit width for differential channel state information. In this case, the configuration may specify the bit width for the differential channel state information. In some examples, the user equipment may determine the bit width for the differential channel state information based on whether half-duplex channel state information is to be reported as a differential relative to full-duplex channel state information, or the full-duplex channel state information is to be reported as a differential relative to the half-duplex channel state information.

FIG. 15 is a flow chart illustrating an example method 1500 for wireless communication (e.g., xDD communication or another form of wireless communication) according to some aspects. In some examples, one or more aspects of the method 1500 may be implemented in conjunction with (e.g., as part of and/or in addition to) the method 1400 of FIG. 14. As described below, some or all illustrated features may be omitted in a particular implementation within the scope of the present disclosure, and some illustrated features may not be required for implementation of all examples. In some examples, the method 1500 may be carried out by the user equipment 1300 illustrated in FIG. 13 or by any suitable apparatus or means for carrying out the functions or algorithm described below.

At block 1502, a user equipment may measure a first channel state information reference signal on a first channel state information reference signal resource associated with full-duplex communication. For example, the CSI reporting circuitry 1343 together with the communication and processing circuitry 1341 and the transceiver 1310, shown and described above in connection with FIG. 13, may provide a means to measure a first channel state information reference signal on a first channel state information reference signal resource associated with full-duplex communication.

At block 1504, the user equipment may measure a second channel state information reference signal on a second channel state information reference signal resource associated with half-duplex communication. For example, the CSI reporting circuitry 1343 together with the communication and processing circuitry 1341 and the transceiver 1310, shown and described above in connection with FIG. 13, may provide a means to measure a second channel state information reference signal on a second channel state information reference signal resource associated with half-duplex communication.

At block 1506, the user equipment may generate baseline channel state information and differential channel state information. For example, the CSI reporting circuitry 1343, shown and described above in connection with FIG. 13, may provide a means to generate baseline channel state information and differential channel state information.

In one configuration, the user equipment 1300 includes means for receiving a configuration for measuring channel state information reference signals associated with full-duplex communication and half-duplex communication, and means for transmitting at least one channel state information report comprising first channel state information and second channel state information, wherein the second channel state information is defined as a differential relative to the first channel state information. In one aspect, the aforementioned means may be the processor 1304 shown in FIG. 13 configured to perform the functions recited by the aforementioned means (e.g., as discussed above). In another aspect, the aforementioned means may be a circuit or any apparatus configured to perform the functions recited by the aforementioned means.

Of course, in the above examples, the circuitry included in the processor 1304 is merely provided as an example, and other means for carrying out the described functions may be included within various aspects of the present disclosure, including but not limited to the instructions stored in the computer-readable medium 1306, or any other suitable apparatus or means described in any one or more of FIGS. 1, 2, 4A, 4B, 4C, 6A, 6B, 7, 10, 11, 12, and 13, and utilizing, for example, the methods and/or algorithms described herein in relation to FIGS. 14-15.

Figure 16:
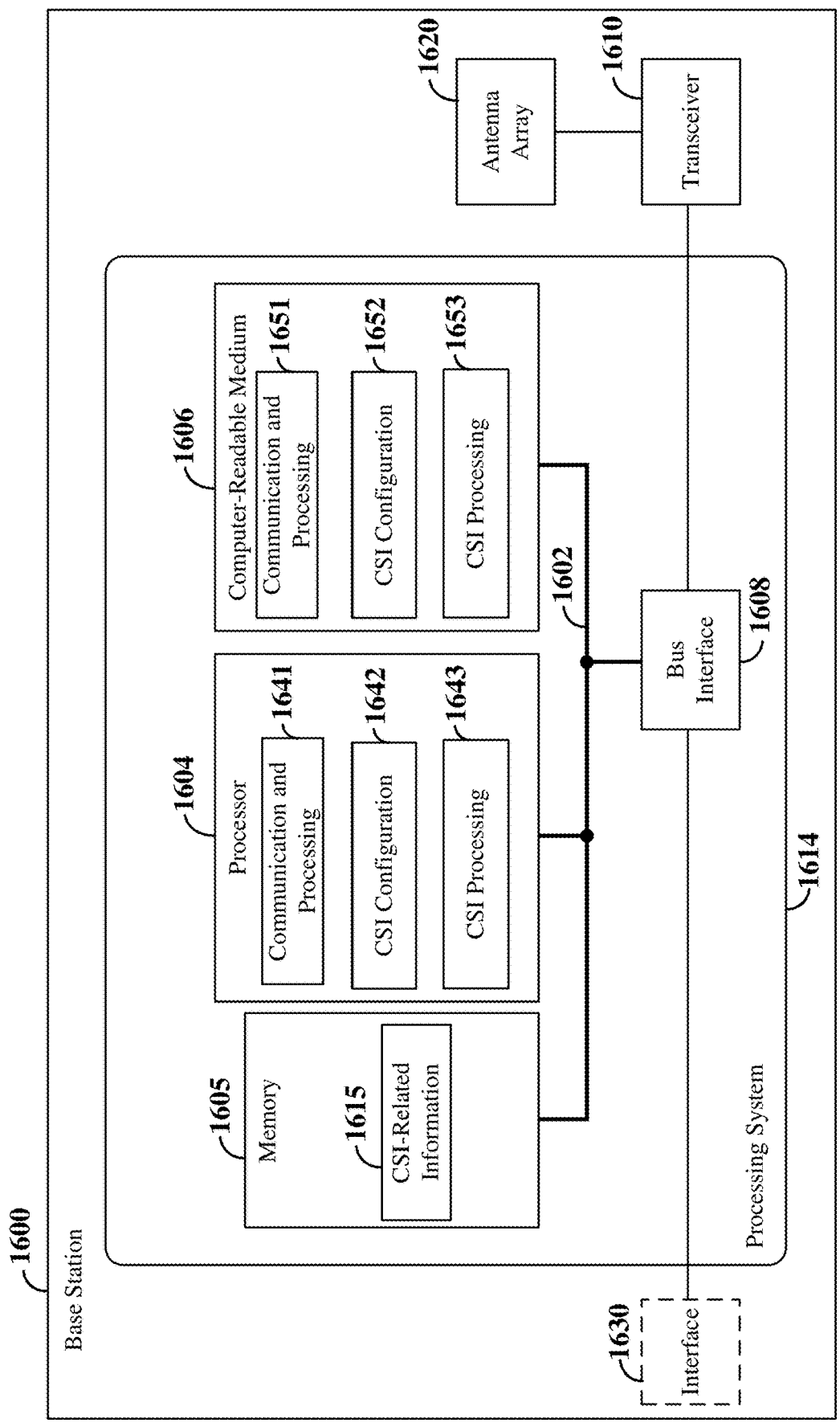
FIG. 16 is a block diagram illustrating an example of a hardware implementation for a base station employing a processing system according to some aspects.

FIG. 16 is a conceptual diagram illustrating an example of a hardware implementation for base station (BS) 1600 employing a processing system 1614. In some implementations, the BS 1600 may correspond to any of the BSs (e.g., gNBs) or scheduling entities shown in any of FIGS. 1, 2, 4A, 4B, 4C, 6A, 6B, 7, 10, 11, and 12.

In accordance with various aspects of the disclosure, an element, or any portion of an element, or any combination of elements may be implemented with the processing system 1614. The processing system may include one or more processors 1604. The processing system 1614 may be substantially the same as the processing system 1314 illustrated in FIG. 13, including a bus interface 1608, a bus 1602, memory 1605, a processor 1604, a computer-readable medium 1606, a transceiver 1610, and an antenna array 1620. The memory 1605 may store CSI-related information 1615 (e.g., CSI reference signal resource configurations, CSI measurement configurations, CSI reporting configurations, etc.) used by the processor 1604 for communication operations (e.g., CSI configuration and CSI report handling) as described herein. Furthermore, the BS 1600 may include an interface 1630 (e.g., a network interface) that provides a means for communicating with at least one other apparatus within a core network and with at least one radio access network.

The BS 1600 may be configured to perform any one or more of the operations described herein (e.g., as described above in conjunction with FIGS. 1-12 and as described below in conjunction with FIGS. 17-18). In some aspects of the disclosure, the processor 1604, as utilized in the BS 1600, may include circuitry configured for various functions.

The processor 1604 may be configured to generate, schedule, and modify a resource assignment or grant of time-frequency resources (e.g., a set of one or more resource elements). For example, the processor 1604 may schedule time-frequency resources within a plurality of time division duplex (TDD) and/or frequency division duplex (FDD) subframes, slots, and/or mini-slots to carry user data traffic and/or control information to and/or from multiple UEs. The processor 1604 may be configured to schedule resources for the transmission of downlink signals. In some examples, the downlink signal may include downlink reference signals (e.g., SSBs or CSI-RSs). The processor 1604 may further be configured to schedule resources for the transmission of uplink signals. In some examples, the uplink signals may include CSI reports.

In some aspects of the disclosure, the processor 1604 may include communication and processing circuitry 1641. The communication and processing circuitry 1644 may be configured to communicate with a UE. The communication and processing circuitry 1641 may include one or more hardware components that provide the physical structure that performs various processes related to communication (e.g., signal reception and/or signal transmission) as described herein. The communication and processing circuitry 1641 may further include one or more hardware components that provide the physical structure that performs various processes related to signal processing (e.g., processing a received signal and/or processing a signal for transmission) as described herein. The communication and processing circuitry 1641 may further be configured to execute communication and processing software 1651 included on the computer-readable medium 1606 to implement one or more functions described herein.

The communication and processing circuitry 1641 may further be configured to receive a message from the UE. For example, the message may be included in a MAC-CE carried in a PUSCH, UCI in a PUCCH or PUSCH, a random access message, or an RRC message. The communication and processing circuitry 1641 may further be configured to receive a scheduling request (e.g., via UCI in a PUCCH) from the UE for an uplink grant for the PUSCH.

In some implementations wherein the communication involves receiving information, the communication and processing circuitry 1641 may obtain information from a component of the BS 1600 (e.g., from the transceiver 1610 that receives the information via radio frequency signaling or some other type of signaling suitable for the applicable communication medium), process (e.g., decode) the information, and output the processed information. For example, the communication and processing circuitry 1641 may output the information to another component of the processor 1604, to the memory 1605, or to the bus interface 1608. In some examples, the communication and processing circuitry 1641 may receive one or more of signals, messages, other information, or any combination thereof. In some examples, the communication and processing circuitry 1641 may receive information via one or more channels. In some examples, the communication and processing circuitry 1641 may include functionality for a means for receiving. In some examples, the communication and processing circuitry 1641 may include functionality for a means for decoding.

In some implementations wherein the communication involves sending (e.g., transmitting) information, the communication and processing circuitry 1641 may obtain information (e.g., from another component of the processor 1604, the memory 1605, or the bus interface 1608), process (e.g., encode) the information, and output the processed information. For example, the communication and processing circuitry 1641 may output the information to the transceiver 1610 (e.g., that transmits the information via radio frequency signaling or some other type of signaling suitable for the applicable communication medium). In some examples, the communication and processing circuitry 1641 may send one or more of signals, messages, other information, or any combination thereof. In some examples, the communication and processing circuitry 1641 may send information via one or more channels. In some examples, the communication and processing circuitry 1641 may include functionality for a means for sending (e.g., a means for transmitting). In some examples, the communication and processing circuitry 1641 may include functionality for a means for encoding.

In some examples, the communication and processing circuitry 1641 may include functionality for a means for communicating information. For example, the communication and processing circuitry 1641 may transmit information to a user equipment via a scheduled downlink resource (e.g., PDSCH). As another example, the communication and processing circuitry 1641 may receive information from a user equipment via a scheduled uplink resource (e.g., PUSCH).

The processor 1604 may include CSI configuration circuitry 1642 configured to perform CSI configuration-related operations (e.g., as discussed herein in conjunction with FIGS. 7-12). The CSI configuration circuitry 1642 may be configured to execute CSI configuration software 1652 included on the computer-readable medium 1606 to implement one or more functions described herein.

Figure 17:
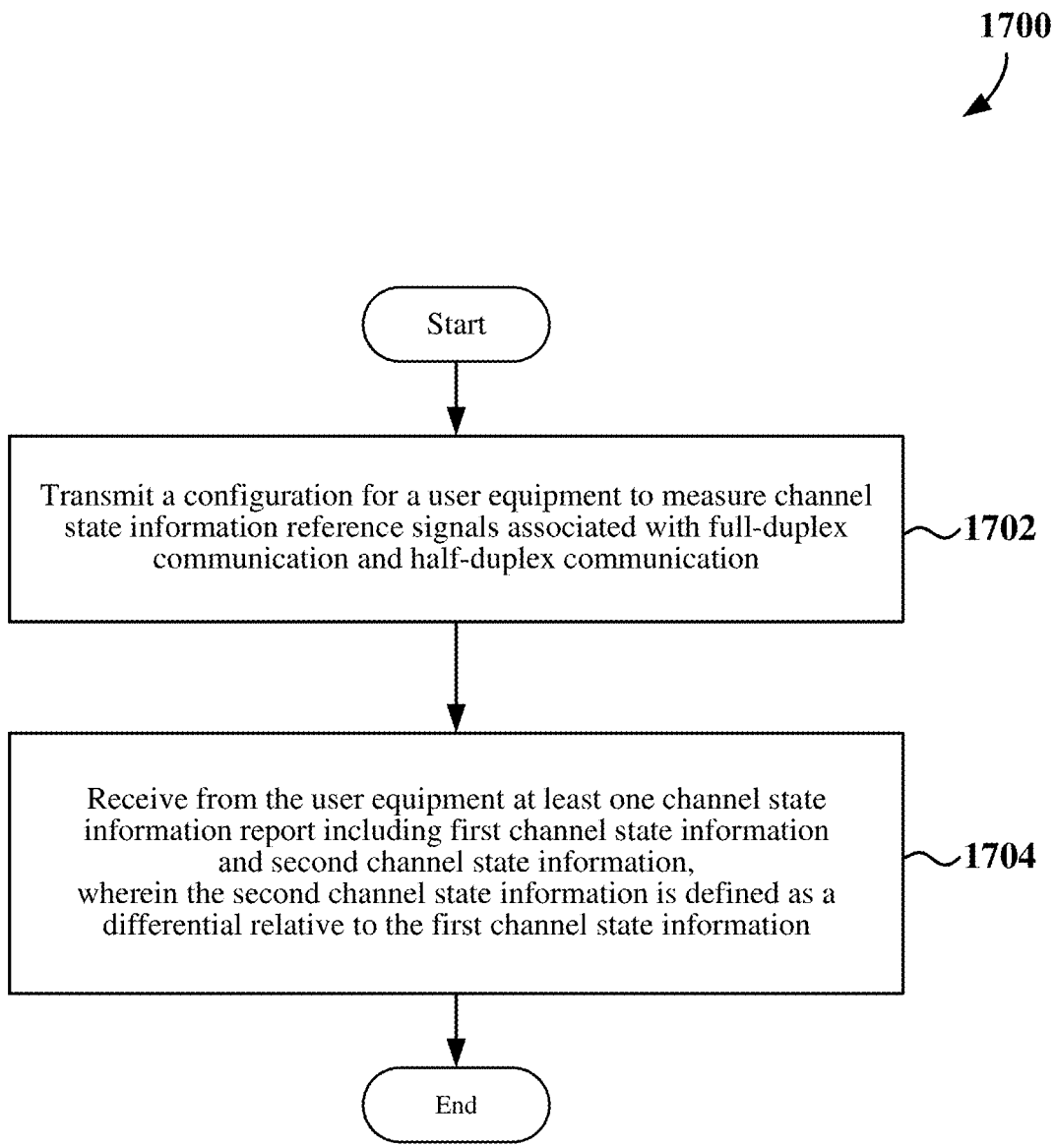
FIG. 17 is a flow chart of an example method for configuring CSI-related measurements according to some aspects.
Figure 18:
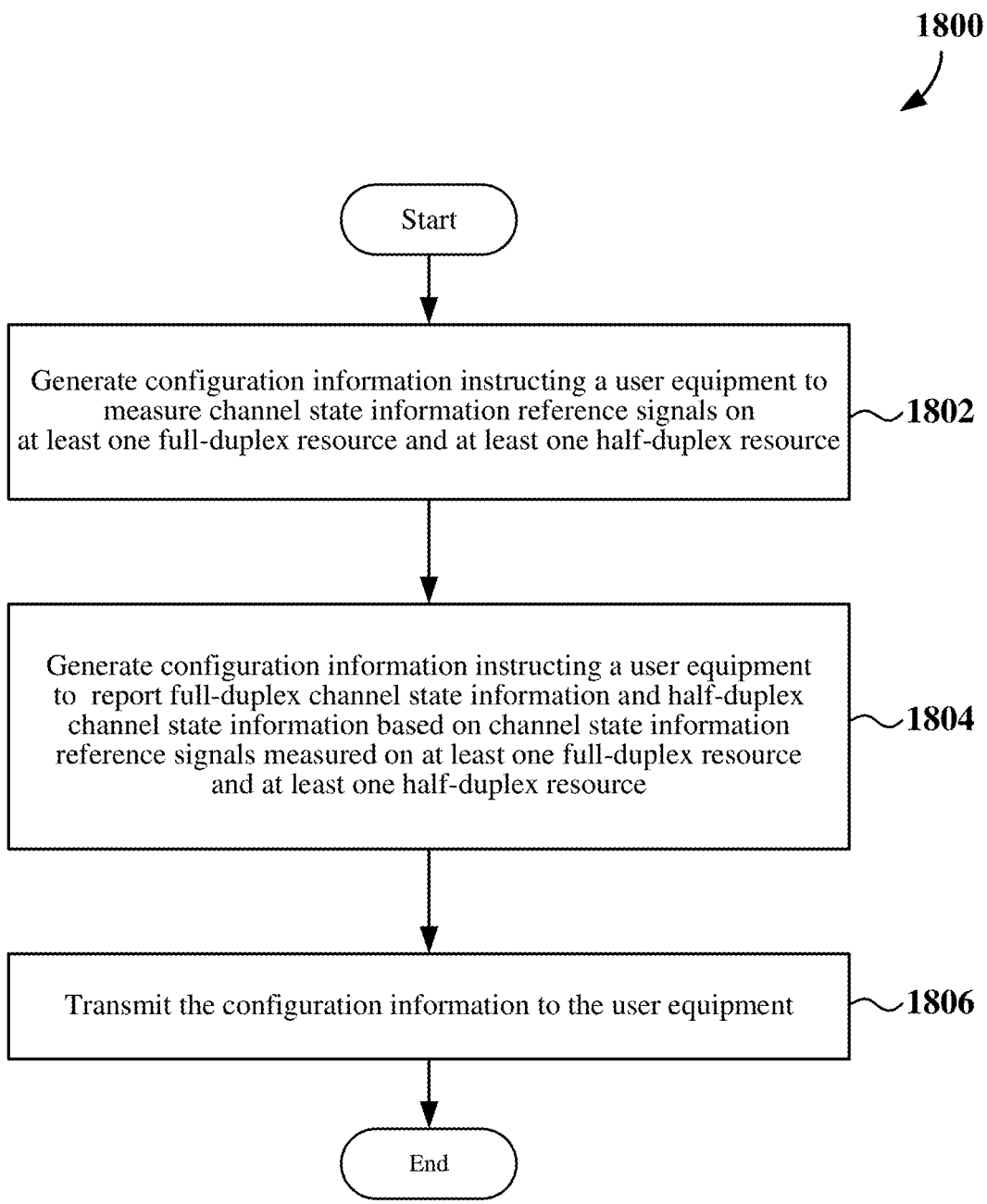
FIG. 18 is a flow chart of an example method for configuring CSI reporting according to some aspects.

The CSI configuration circuitry 1642 may include functionality for a means for generating a configuration (e.g., as discussed at 1006 of FIG. 10, 1106 of FIG. 11, 1206 of FIG. 12, 1702 of FIGS. 17, and/or 1802 and 1804 of FIG. 18). For example, the CSI configuration circuitry 1642 may be configured to select CSI-RS resources to be measured by a UE, select a CSI reporting scheme (e.g., the number of reports, baseline CSI and differential CSI configurations, the type of reporting, etc.), and generate configuration information indicative of such.

The CSI configuration circuitry 1642 may include functionality for a means for transmitting a configuration to a UE (e.g., as discussed at 1008 of FIG. 10, 1108 of FIG. 11, 1206 of FIG. 12, 1702 of FIGS. 17, and/or 1806 of FIG. 18). For example, the CSI configuration circuitry 1642 may be configured to send an RRC configuration message or some other suitable message to a UE via a downlink resource (e.g., PDSCH).

The processor 1604 may include CSI processing circuitry 1643 configured to perform CSI processing-related operations (e.g., as discussed herein in conjunction with FIGS. 7-12). The CSI processing circuitry 1643 may be configured to execute CSI processing software 1653 included on the computer-readable medium 1606 to implement one or more functions described herein.

The CSI processing circuitry 1643 may include functionality for a means for receiving a CSI report (e.g., as discussed at 1024 and 1026 of FIG. 10, 1122 of FIG. 11, 1220 of FIGS. 12, and/or 1704 of FIG. 17). For example, the CSI processing circuitry 1643 may be configured to monitor an uplink resource (e.g., a PUSCH or a PUCCH) for UCI from the UE that carries at least one CSI report.

FIG. 17 is a flow chart illustrating an example method 1700 for wireless communication (e.g., xDD communication or another form of wireless communication) according to some aspects. As described below, some or all illustrated features may be omitted in a particular implementation within the scope of the present disclosure, and some illustrated features may not be required for implementation of all examples. In some examples, the method 1700 may be carried out by the BS 1600 illustrated in FIG. 16 or by any suitable apparatus or means for carrying out the functions or algorithm described below.

At block 1702, a base station may transmit a configuration for a user equipment to measure channel state information reference signals associated with full-duplex communication and half-duplex communication. For example, the CSI configuration circuitry 1642 together with the communication and processing circuitry 1641 and the transceiver 1610, shown and described above in connection with FIG. 16, may provide a means to transmit a configuration for a user equipment to measure channel state information reference signals associated with full-duplex communication and half-duplex communication.

In some examples, the configuration indicates a first channel state information reference signal resource set for a first channel state information reference signal associated with the full-duplex communication. In some examples the configuration indicates a second channel state information reference signal resource set for a second channel state information reference signal associated with the half-duplex communication.

In some examples, the configuration indicates a channel state information reference signal resource set that includes a first channel state information reference signal resource for a first channel state information reference signal associated with the full-duplex communication, and a second channel state information reference signal resource for a second channel state information reference signal associated with the half-duplex communication.

In some examples, the configuration indicates a channel state information reference signal resource. In this case, the base station may transmit a first channel state information reference signal associated with the full-duplex communication on a first instance of the channel state information reference signal resource, and transmit a second channel state information reference signal associated with the half-duplex communication on a second instance of the channel state information reference signal resource.

At block 1704, the base station may receive from the user equipment at least one channel state information report including first channel state information and second channel state information, wherein the second channel state information is defined as a differential relative to the first channel state information. For example, the CSI processing circuitry 1643 together with the communication and processing circuitry 1641 and the transceiver 1610, shown and described above in connection with FIG. 16, may provide a means to receive from the user equipment at least one channel state information report including first channel state information and second channel state information.

In some examples, the base station may determine, based on the first channel state information and the second channel state information, first channel information associated with the full-duplex communication, and second channel information associated with the half-duplex communication. In some examples, the base station may determine, based on the first channel state information and the second channel state information, a single set of transmission parameters for the full-duplex communication and the half-duplex communication. In some examples, the base station may determine, based on the first channel state information and the second channel state information, whether to schedule the user equipment on a full-duplex slot.

In some examples, the at least one channel state information report is a single channel state information report, the first channel state information is included in a first channel state information part of the single channel state information report, and the second channel state information is included in a second channel state information part of the single channel state information report or in a third channel state information report part of the single channel state information report.

In some examples, the at least one channel state information report may include a first channel state information report for the first channel state information, the first channel state information being indicative of a first measurement of a first channel state information reference signal. In some examples, the at least one channel state information report may include a second channel state information report for the second channel state information, the second channel state information being indicative of a second measurement of a second channel state information reference signal. The second channel state information report may be linked to the first channel state information report based on at least one of an aperiodic trigger state definition, a pre-configured rule, a radio resource control configuration, or a combination thereof.

In some examples, the first channel state information and the second channel state information specify half-duplex channel state information as a differential relative to full-duplex channel state information. In some examples, the first channel state information and the second channel state information specify the full-duplex channel state information as a differential relative to the half-duplex channel state information.

In some examples, the at least one channel state information report may include a first channel state information report for the first channel state information and a second channel state information report for the second channel state information. In some examples, the configuration specifies a first channel state information report quantity for the first channel state information, and a second channel state information report quantity, different from the first channel state information report quantity, for the second channel state information.

In some examples, the at least one channel state information report may include a first channel state information report for the first channel state information and a second channel state information report for the second channel state information. In some examples, the configuration specifies that the first channel state information report includes baseline information or that the second channel state information report includes differential information.

In some examples, the at least one channel state information report may include a single channel state information report. In some examples, the configuration specifies a first channel state information report quantity for the first channel state information, and a second channel state information report quantity, different from the first channel state information report quantity, for the second channel state information.

In some examples, the at least one channel state information report may include a single channel state information report. In some examples, the configuration specifies that the single channel state information report includes baseline information and differential information.

In some examples, the user equipment may use a defined bit width for differential channel state information. In this case, the configuration may specify the bit width for the differential channel state information. In some examples, the user equipment may determine the bit width for the differential channel state information based on whether half-duplex channel state information is to be reported as a differential relative to full-duplex channel state information, or the full-duplex channel state information is to be reported as a differential relative to the half-duplex channel state information.

FIG. 18 is a flow chart illustrating an example method 1800 for wireless communication (e.g., xDD communication or another form of wireless communication) according to some aspects. In some examples, one or more aspects of the method 1800 may be implemented in conjunction with (e.g., as part of and/or in addition to) the method 1700 of FIG. 17. As described below, some or all illustrated features may be omitted in a particular implementation within the scope of the present disclosure, and some illustrated features may not be required for implementation of all examples. In some examples, the method 1800 may be carried out by the BS 1600 illustrated in FIG. 16 or by any suitable apparatus or means for carrying out the functions or algorithm described below.

At block 1802, a base station may generate configuration information instructing a user equipment to measure channel state information reference signals on at least one full-duplex resource and at least one half-duplex resource. For example, the CSI configuration circuitry 1642, shown and described above in connection with FIG. 16, may provide a means to generate configuration information instructing a user equipment to measure channel state information reference signals on at least one full-duplex resource and at least one half-duplex resource.

At block 1804, the base station may generate configuration information instructing a user equipment to report full-duplex channel state information and half-duplex channel state information based on channel state information reference signals measured on at least one full-duplex resource and at least one half-duplex resource. For example, the CSI configuration circuitry 1642, shown and described above in connection with FIG. 16, may provide a means to generate configuration information instructing a user equipment to report full-duplex channel state information and half-duplex channel state information based on channel state information reference signals measured on at least one full-duplex resource and at least one half-duplex resource.

At block 1806, the base station may transmit the configuration information to the user equipment. For example, the CSI configuration circuitry 1642 together with the communication and processing circuitry 1641 and the transceiver 1610, shown and described above in connection with FIG. 16, may provide a means to transmit the configuration information to the user equipment.

In one configuration, the BS 1600 includes means for transmitting a configuration for a user equipment to measure channel state information reference signals associated with full-duplex communication and half-duplex communication, and means for receiving from the user equipment at least one channel state information report comprising first channel state information and second channel state information, wherein the second channel state information is defined as a differential relative to the first channel state information. In one aspect, the aforementioned means may be the processor 1604 shown in FIG. 16 configured to perform the functions recited by the aforementioned means (e.g., as discussed above). In another aspect, the aforementioned means may be a circuit or any apparatus configured to perform the functions recited by the aforementioned means.

Of course, in the above examples, the circuitry included in the processor 1604 is merely provided as an example, and other means for carrying out the described functions may be included within various aspects of the present disclosure, including but not limited to the instructions stored in the computer-readable medium 1606, or any other suitable apparatus or means described in any one or more of FIGS. 1, 2, 4A, 4B, 4C, 6A, 6B, 7, 10, 11, 12, and 16, and utilizing, for example, the methods and/or algorithms described herein in relation to FIGS. 17-18.

The methods shown in FIGS. 14, 15, 17, and 18 may include additional aspects, such as any single aspect or any combination of aspects described below and/or in connection with one or more other processes described elsewhere herein. The following provides an overview of several aspects of the present disclosure.

Aspect 1: A method for wireless communication at a user equipment, the method comprising: receiving a configuration for measuring channel state information reference signals associated with full-duplex communication and half-duplex communication; and transmitting at least one channel state information report comprising first channel state information and second channel state information, wherein the second channel state information is defined as a differential relative to the first channel state information.

Aspect 2: The method of aspect 1, wherein the configuration indicates: a first channel state information reference signal resource set for a first channel state information reference signal associated with the full-duplex communication; and a second channel state information reference signal resource set for a second channel state information reference signal associated with the half-duplex communication.

Aspect 3: The method of aspect 1, wherein the configuration indicates a channel state information reference signal resource set that comprises: a first channel state information reference signal resource for a first channel state information reference signal associated with the full-duplex communication; and a second channel state information reference signal resource for a second channel state information reference signal associated with the half-duplex communication.

Aspect 4: The method of aspect 1, wherein: the configuration indicates a channel state information reference signal resource; the method further comprises receiving a first channel state information reference signal associated with the full-duplex communication on a first instance of the channel state information reference signal resource; and the method further comprises receiving a second channel state information reference signal associated with the half-duplex communication on a second instance of the channel state information reference signal resource.

Aspect 5: The method of any of aspects 1 through 4, wherein: the at least one channel state information report is a single channel state information report; the first channel state information is included in a first channel state information part of the single channel state information report; and the second channel state information is included in a second channel state information part of the single channel state information report or in a third channel state information report part of the single channel state information report.

Aspect 6: The method of any of aspects 1 through 4, wherein the at least one channel state information report comprises: a first channel state information report for the first channel state information, the first channel state information being indicative of a first measurement of a first channel state information reference signal; a second channel state information report for the second channel state information, the second channel state information being indicative of a second measurement of a second channel state information reference signal; and the second channel state information report is linked to the first channel state information report based on at least one of: an aperiodic trigger state definition, a pre-configured rule, a radio resource control configuration, or a combination thereof.

Aspect 7: The method of any of aspects 1 through 6, further comprising: reporting half-duplex channel state information as a differential relative to full-duplex channel state information; or reporting the full-duplex channel state information as a differential relative to the half-duplex channel state information.

Aspect 8: The method of any of aspects 1 through 6, further comprising: determining, based on the configuration, a configured trigger state, or a pre-configured rule, whether: half-duplex channel state information is to be reported as a differential relative to full-duplex channel state information;

or the full-duplex channel state information is to be reported as a differential relative to the half-duplex channel state information.

Aspect 9: The method of any of aspects 1 through 4 and 6 through 8, wherein: the at least one channel state information report comprises a first channel state information report for the first channel state information and a second channel state information report for the second channel state information; and the configuration specifies a first channel state information report quantity for the first channel state information, and a second channel state information report quantity, different from the first channel state information report quantity, for the second channel state information.

Aspect 10: The method of any of aspects 1 through 4 and 6 through 9, wherein: the at least one channel state information report comprises a first channel state information report for the first channel state information and a second channel state information report for the second channel state information; and the configuration specifies that the first channel state information report includes baseline information or that the second channel state information report includes differential information.

Aspect 11: The method of any of aspects 1 through 5 and 7 through 8, wherein: the at least one channel state information report comprises a single channel state information report; and the configuration specifies a first channel state information report quantity for the first channel state information, and a second channel state information report quantity, different from the first channel state information report quantity, for the second channel state information.

Aspect 12: The method of any of aspects 1 through 5 and 7 through 8, wherein: the at least one channel state information report comprises a single channel state information report; and the configuration specifies that the single channel state information report includes baseline information and differential information.

Aspect 13: The method of any of aspects 1 through 12, wherein: the method further comprises using a defined bit width for differential channel state information; the configuration specifies the bit width for the differential channel state information; or the method further comprises determining the bit width for the differential channel state information based on whether: half-duplex channel state information is to be reported as a differential relative to full-duplex channel state information, or the full-duplex channel state information is to be reported as a differential relative to the half-duplex channel state information.

Aspect 15: A method for wireless communication at a base station, the method comprising: transmitting a configuration for a user equipment to measure channel state information reference signals associated with full-duplex communication and half-duplex communication; and receiving from the user equipment at least one channel state information report comprising first channel state information and second channel state information, wherein the second channel state information is defined as a differential relative to the first channel state information.

Aspect 16: The method of aspect 15, wherein the configuration indicates: a first channel state information reference signal resource set for a first channel state information reference signal associated with the full-duplex communication, and a second channel state information reference signal resource set for a second channel state information reference signal associated with the half-duplex communication; or a channel state information reference signal resource set that comprises: a first channel state information reference signal resource for a first channel state information reference signal associated with the full-duplex communication, and a second channel state information reference signal resource for a second channel state information reference signal associated with the half-duplex communication.

Aspect 17: The method of any of aspects 15 through 16, wherein the first channel state information and the second channel state information specify: half-duplex channel state information as a differential relative to full-duplex channel state information; or the full-duplex channel state information as a differential relative to the half-duplex channel state information.

Aspect 18: The method of any of aspects 15 through 17, further comprising: determining, based on the first channel state information and the second channel state information, first channel information associated with the full-duplex communication; and second channel information associated with the half-duplex communication.

Aspect 19: The method of any of aspects 15 through 18, further comprising: determining, based on the first channel state information and the second channel state information, a single set of transmission parameters for the full-duplex communication and the half-duplex communication.

Aspect 20: The method of any of aspects 15 through 19, further comprising: determining, based on the first channel state information and the second channel state information, whether to schedule the user equipment on a full-duplex slot.

Aspect 21: A user equipment comprising: a transceiver configured to communicate with a radio access network, a memory, and a processor coupled to the transceiver and the memory, wherein the processor and the memory are configured to perform any one of aspects 1 through 13.

Aspect 22: An apparatus configured for wireless communication comprising at least one means for performing any one of aspects 1 through 13.

Aspect 23: A non-transitory computer-readable medium storing computer-executable code, comprising code for causing an apparatus to perform any one of aspects 1 through 13.

Aspect 24: A base station comprising: a transceiver, a memory, and a processor coupled to the transceiver and the memory, wherein the processor and the memory are configured to perform any one of aspects 15 through 20.

Aspect 25: An apparatus configured for wireless communication comprising at least one means for performing any one of aspects 15 through 20.

Aspect 26: A non-transitory computer-readable medium storing computer-executable code, comprising code for causing an apparatus to perform any one of aspects 15 through 20.

Several aspects of a wireless communication network have been presented with reference to an example implementation. As those skilled in the art will readily appreciate, various aspects described throughout this disclosure may be extended to other telecommunication systems, network architectures and communication standards.

By way of example, various aspects may be implemented within other systems defined by 3GPP, such as Long-Term Evolution (LTE), the Evolved Packet System (EPS), the Universal Mobile Telecommunication System (UMTS), and/or the Global System for Mobile (GSM). Various aspects may also be extended to systems defined by the 3rd Generation Partnership Project 2 (3GPP2), such as CDMA2000 and/or Evolution-Data Optimized (EV-DO). Other examples may be implemented within systems employing Institute of Electrical and Electronics Engineers (IEEE) 802.11 (Wi-Fi), IEEE 802.16 (WiMAX), IEEE 802.20, Ultra-Wideband (UWB), Bluetooth, and/or other suitable systems. The actual telecommunication standard, network architecture, and/or communication standard employed will depend on the specific application and the overall design constraints imposed on the system.

Within the present disclosure, the word "exemplary" is used to mean "serving as an example, instance, or illustration." Any implementation or aspect described herein as "exemplary" is not necessarily to be construed as preferred or advantageous over other aspects of the disclosure. Likewise, the term "aspects" does not require that all aspects of the disclosure include the discussed feature, advantage or mode of operation. The term "coupled" is used herein to refer to the direct or indirect coupling between two objects. For example, if object A physically touches object B, and object B touches object C, then objects A and C may still be considered coupled to one another even if they do not directly physically touch each other. For instance, a first object may be coupled to a second object even though the first object is never directly physically in contact with the second object. The terms "circuit" and "circuitry" are used broadly, and intended to include both hardware implementations of electrical devices and conductors that, when connected and configured, enable the performance of the functions described in the present disclosure, without limitation as to the type of electronic circuits, as well as software implementations of information and instructions that, when executed by a processor, enable the performance of the functions described in the present disclosure. As used herein, the term "determining" may include, for example, ascertaining, resolving, selecting, choosing, establishing, calculating, computing, processing, deriving, investigating, looking up (e.g., looking up in a table, a database or another data structure), and the like. Also, "determining" may include receiving (e.g., receiving information), accessing (e.g., accessing data in a memory), and the like.

One or more of the components, steps, features and/or functions illustrated in FIGS. 1-18 may be rearranged and/or combined into a single component, step, feature or function or embodied in several components, steps, or functions. Additional elements, components, steps, and/or functions may also be added without departing from novel features disclosed herein. The apparatus, devices, and/or components illustrated in FIGS. FIGS. 1, 2, 4A, 4B, 4C, 6A, 6B, 7, 10, 11, 12, 13, and 16 may be configured to perform one or more of the methods, features, or steps described herein. The novel algorithms described herein may also be efficiently implemented in software and/or embedded in hardware.

It is to be understood that the specific order or hierarchy of steps in the methods disclosed is an illustration of example processes. Based upon design preferences, it is understood that the specific order or hierarchy of steps in the methods may be rearranged. The accompanying method claims present elements of the various steps in a sample order, and are not meant to be limited to the specific order or hierarchy presented unless specifically recited therein.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language of the claims, wherein reference to an element in the singular is not intended to mean "one and only one" unless specifically so stated, but rather "one or more." Unless specifically stated otherwise, the term "some" refers to one or more. A phrase referring to "at least one of" a list of items refers to any combination of those items, including single members. As an example, "at least one of: a, b, or c" is intended to cover: a; b; c; a and b; a and c; b and c; and a, b, and c. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims.

What is claimed is:

1. A user equipment, comprising:
a transceiver;
one or more memories storing processor-executable code; and
one or more processors configured to execute the processor-executable code to cause the user equipment to:
receive via the transceiver a configuration for measuring channel state information reference signals associated with full-duplex communication and half-duplex communication, the configuration indicating that the user equipment is to report baseline channel state information and report differential channel state information relative to the baseline channel state information; and
transmit via the transceiver at least one channel state information report comprising first channel state information and second channel state information, the first channel state information corresponding to the baseline channel state information, and the second channel state information corresponding to the differential channel state information and defined relative to the first channel state information.

2. The user equipment of claim 1, wherein the configuration indicates:
a first channel state information reference signal resource set for a first channel state information reference signal associated with the full-duplex communication; and
a second channel state information reference signal resource set for a second channel state information reference signal associated with the half-duplex communication.

3. The user equipment of claim 1, wherein the configuration indicates a channel state information reference signal resource set that comprises:
a first channel state information reference signal resource for a first channel state information reference signal associated with the full-duplex communication; and
a second channel state information reference signal resource for a second channel state information reference signal associated with the half-duplex communication.

4. The user equipment of claim 1, wherein:
the configuration indicates a channel state information reference signal resource;
the one or more processors are further configured to execute the processor-executable code to cause the user equipment to receive a first channel state information reference signal associated with the full-duplex communication on a first instance of the channel state information reference signal resource; and
the one or more processors are further configured to execute the processor-executable code to cause the user equipment to receive a second channel state information reference signal associated with the half-duplex communication on a second instance of the channel state information reference signal resource.

5. The user equipment of claim 1, wherein:
the at least one channel state information report is a single channel state information report;
the first channel state information is included in a first channel state information part of the single channel state information report; and
the second channel state information is included in a second channel state information part of the single channel state information report or in a third channel state information report part of the single channel state information report.

6. The user equipment of claim 1, wherein the at least one channel state information report comprises:
a first channel state information report for the first channel state information, the first channel state information being indicative of a first measurement of a first channel state information reference signal;
a second channel state information report for the second channel state information, the second channel state information being indicative of a second measurement of a second channel state information reference signal; and
the second channel state information report is linked to the first channel state information report based on at least one of: an aperiodic trigger state definition, a pre-configured rule, or a combination thereof.

7. The user equipment of claim 1, wherein the one or more processors are further configured to execute the processor-executable code to cause the user equipment to:
report half-duplex channel state information as a differential relative to full-duplex channel state information; or
report the full-duplex channel state information as a differential relative to the half-duplex channel state information.

8. The user equipment of claim 1, wherein one or more processors are further configured to execute the processor-executable code to cause the user equipment to determine, based on the configuration, a configured trigger state, or a pre-configured rule, whether:
half-duplex channel state information is to be reported as a differential relative to full-duplex channel state information; or
the full-duplex channel state information is to be reported as a differential relative to the half-duplex channel state information.

9. The user equipment of claim 1, wherein:
the at least one channel state information report comprises a first channel state information report for the first channel state information and a second channel state information report for the second channel state information; and
the configuration specifies a first channel state information report quantity for the first channel state information, and a second channel state information report quantity, different from the first channel state information report quantity, for the second channel state information.

10. The user equipment of claim 1, wherein:
the at least one channel state information report comprises a first channel state information report for the first channel state information and a second channel state information report for the second channel state information; and
the configuration specifies that the first channel state information report includes baseline information or that the second channel state information report includes differential information.

11. The user equipment of claim 1, wherein:
the at least one channel state information report comprises a single channel state information report; and
the configuration specifies a first channel state information report quantity for the first channel state information, and a second channel state information report quantity, different from the first channel state information report quantity, for the second channel state information.

12. The user equipment of claim 1, wherein:
the at least one channel state information report comprises a single channel state information report; and
the configuration specifies that the single channel state information report includes baseline information and differential information.

13. The user equipment of claim 1, wherein:
the one or more processors are further configured to execute the processor-executable code to cause the user equipment to use a defined bit width for the differential channel state information;
the configuration specifies the bit width for the differential channel state information; or
the one or more processors are further configured to execute the processor-executable code to cause the user equipment to determine the bit width for the differential channel state information based on whether: half-duplex channel state information is to be reported as a differential relative to full-duplex channel state information, or the full-duplex channel state information is to be reported as a differential relative to the half-duplex channel state information.

14. A method for wireless communication at a user equipment, the method comprising:
receiving a configuration for measuring channel state information reference signals associated with full-duplex communication and half-duplex communication, the configuration indicating that the user equipment is to report baseline channel state information and report differential channel state information relative to the baseline channel state information; and
transmitting at least one channel state information report comprising first channel state information and second channel state information, the first channel state information corresponding to the baseline channel state information, and the second channel state information corresponding to the differential channel state information and defined relative to the first channel state information.

15. A base station, comprising:
a transceiver;
one or more memories storing processor-executable code; and
one or more processors configured to execute the processor-executable code to cause the base station to:
transmit via the transceiver a configuration for a user equipment to measure channel state information reference signals associated with full-duplex communication and half-duplex communication, the configuration indicating that the user equipment is to report baseline channel state information and report differential channel state information relative to the baseline channel state information; and receive from the user equipment via the transceiver at least one channel state information report comprising first channel state information and second channel state information, the first channel state information corresponding to the baseline channel state information, and the second channel state information corresponding to the differential channel state information and defined relative to the first channel state information.

16. The base station of claim 15, wherein the configuration indicates:
- a first channel state information reference signal resource set for a first channel state information reference signal associated with the full-duplex communication, and a second channel state information reference signal resource set for a second channel state information reference signal associated with the half-duplex communication; or
- a channel state information reference signal resource set that comprises: a first channel state information reference signal resource for a first channel state information reference signal associated with the full-duplex communication, and a second channel state information reference signal resource for a second channel state information reference signal associated with the half-duplex communication.

17. The base station of claim 15, wherein the first channel state information and the second channel state information specify:
- half-duplex channel state information as a differential relative to full-duplex channel state information; or
- the full-duplex channel state information as a differential relative to the half-duplex channel state information.

18. The base station of claim 15, wherein the one or more processors are further configured to execute the processor-executable code to cause the base station to determine, based on the first channel state information and the second channel state information:
- first channel information associated with the full-duplex communication; and
- second channel information associated with the half-duplex communication.

19. The base station of claim 15, wherein the one or more processors are further configured to execute the processor-executable code to cause the base station to:
- determine, based on the first channel state information and the second channel state information, a single set of transmission parameters for the full-duplex communication and the half-duplex communication; and
- transmit to the user equipment via the transceiver the single set of transmission parameters for the full-duplex communication and the half-duplex communication.

20. The base station of claim 15, wherein the one or more processors are further configured to execute the processor-executable code to cause the base station to determine, based on the first channel state information and the second channel state information, whether to schedule the user equipment on a full-duplex slot.

* * * * *